(12) United States Patent
Juen et al.

(10) Patent No.: US 10,848,407 B2
(45) Date of Patent: Nov. 24, 2020

(54) EFFICIENT DENSITY BASED GEO CLUSTERING

(71) Applicant: Oath Inc., New York, NY (US)

(72) Inventors: Joshua Juen, Chicago, IL (US); Sepideh Rezvani, Chicago, IL (US)

(73) Assignee: Oath Inc., New York, NY (US)

(*) Notice: Subject to any disclaimer, the term of this patent is extended or adjusted under 35 U.S.C. 154(b) by 14 days.

(21) Appl. No.: 16/391,062

(22) Filed: Apr. 22, 2019

(65) Prior Publication Data

US 2020/0336400 A1  Oct. 22, 2020

(51) Int. Cl.
*H04L 12/28* (2006.01)
*H04L 12/26* (2006.01)
*H04L 29/08* (2006.01)

(52) U.S. Cl.
CPC .......... *H04L 43/0864* (2013.01); *H04L 67/18* (2013.01)

(58) Field of Classification Search
CPC ...................................................... H04L 12/28
USPC ........................................................ 370/400
See application file for complete search history.

(56) References Cited

U.S. PATENT DOCUMENTS

2017/0300566 A1* 10/2017 Robb ................... G06F 16/909

* cited by examiner

*Primary Examiner* — Dang T Ton
(74) *Attorney, Agent, or Firm* — Cooper Legal Group, LLC

(57) ABSTRACT

Methods and systems for mapping a plurality of client devices includes identifying a plurality of points distributed in a network space and sorting the points by latitude to generate a first list of points. A cluster window is defined for each point in the first list with a size defined by a clustering distance. The cluster window for a point includes a plurality of other points with a latitude that are within the clustering distance from the point. A density score is computed for each point in the cluster window and a second list is generated in accordance to the computed density score of the points within the cluster window starting with a point with highest density score. A cluster is created for a first point in the second list with the first point as the cluster center and including points that are within a Haversine distance from the cluster center of the cluster. The points in the network space are used to create a plurality of clusters with each cluster modeling a geographical area within the network space with client devices in the area exhibiting similar network characteristics.

19 Claims, 13 Drawing Sheets

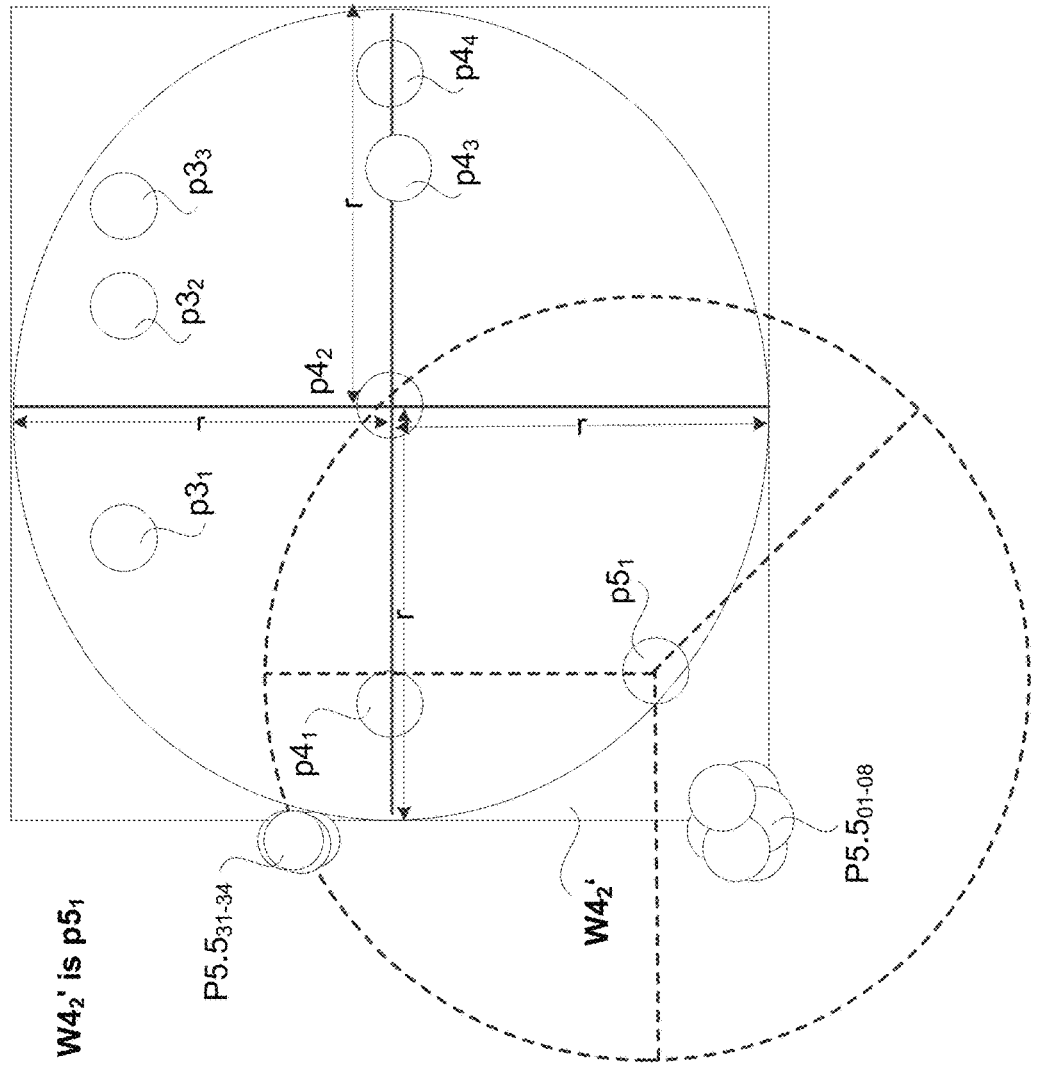

EFFICIENT DENSITY BASED GEO CLUSTERING

FIELD OF THE INVENTION

The invention relates generally to ways of clustering IP addresses of client devices of users in order to analyze performance of networks across the world.

BACKGROUND

Description of the Related Art

Amount of data generated and exchanged have grown exponentially over the years since the advent of the Internet. Content/service providers maintain a content distribution network to service billions of requests from users around the globe. Content/service providers are constantly looking for ways to improve speed at which content is provided to the users. In order to provide faster access to data with minimal latency and to improve quality of service, the service and/or content providers deploy globally distributed servers to service the requests of the users. Even with such distributed network of servers, there can be instances where performance bottlenecks can occur due to load on the servers or due to load on the communication bandwidth due to amount of data being exchanged between the server and the client devices requesting such data. In order to provide quality of service, areas where performance bottlenecks are usually occurring need to be precisely identified so that necessary action can be taken to improve the speed of accessing such data. Due to the vastness of the geographical area over which the client devices are accessing the content distribution network, and the size and complexity of the content distribution system, it is especially challenging to precisely identify areas where performance bottlenecks are occurring.

Content distributors use some version of classification algorithm to map the client devices using internet protocol (IP) addresses in order to identify areas where performance bottlenecks may be occurring. However, these conventional classification algorithms that were used to map the internet protocol (IP) space organized the client devices by dividing the geographical area into arbitrary geo regions, such as country, state, city, etc., or used geo-Hashes with arbitrary latitude/longitude cutoffs. Such organization of the client devices by the conventional classification algorithm are not efficient, as the highly dense areas were divided in a random fashion—e.g., divided users in middle of New York city or Los Angeles, or used some other arbitrary human-drawn boundaries.

Performing analysis with data obtained from such geo-clustering are costly and time consuming as the data from geo-clustering are not precise and need significant analysis to pinpoint areas where performance are sub-optimal. Such analysis can run in the order of weeks.

It is in this context that the embodiments of the invention arise.

SUMMARY

Embodiments of the disclosure provide a clustering algorithm to cluster users in highly dense areas, so as to group similar users into meaningful geo-clusters. The clustering algorithm that is used to cluster the users is based on distribution of the client devices. The geo-clustering algorithm employed herein significantly reduces runtime for identifying such geo-clusters by, (a) reducing search space, and (b) relaxing constraints while performing geo-clustering. The search space is reduced by using a sliding window approach to minimize number of points under consideration. The constraints are relaxed by locating local optimal clusters instead of global optimal clusters. These two optimizations lower the runtime significantly. Additional reduction in the runtime is achieved by only conducting expensive Haversine distance computation for points within each of the local optimal clusters.

The geo-clusters generated by the clustering algorithm accurately model areas within Internet Protocol (IP) address space that have similar network path and network characteristics as the clustering is done based on actual distribution density of the client devices instead of random geo-political or user-defined cut-offs/boundaries. The local optimal clusters are determined by first performing simple distance calculation to identify areas of high density (by performing density score computation) and then performing Haversine distance computation within each high density area to generate geo-clusters with distinct cluster centers. These geo-clusters have resulted in efficient grouping of client devices that exhibit similar network characteristics. The density-based clustering is used to precisely identify areas where network performance can be improved to better service clients' needs.

It should be appreciated that the present embodiments can be implemented in numerous ways, such as a process, an apparatus, a system, a device, or a method on a computer readable medium. Several embodiments are described below.

In one implementation, a method for mapping client devices within a network space, is disclosed. The method includes identifying a plurality of points that are distributed in the network space. Each point corresponds to one or more client devices that are used to request content from a content distribution server and is represented by a latitude and a longitude. The plurality of points is sorted by latitude to generate a first list of points. A cluster window is defined for each point in the first list using a predefined clustering distance that identifies a beginning point and an end point. The cluster window includes select ones of other points from the network space with latitude that is less than the predefined clustering distance from the point. A density score is computed for each point included in each cluster window by counting a number of other points that are within a clustering radius of the respective point, wherein the clustering radius is defined by the predefined clustering distance. The points in the network space are organized into a second list in accordance to the cluster window and computed density score within each cluster window, starting with a specific point within each cluster window with a highest density score at the beginning of the list for that cluster window. A cluster is generated with the specific point in the cluster window as a cluster center and including select ones of the points from the second list whose Haversine distance from the specific point are within the clustering radius. Each of the clusters generated for the network space models an area within the network space where the plurality of client devices exhibit similar network characteristics. The clusters generated for the network space are used to identify performance issues including round trip time latency that exceeds by a predefined amount, or any other issues that can affect the network performance.

In some implementations, generating the cluster includes removing the select ones of the points that are included in the cluster, from further consideration in the network space.

In some implementations, generating the cluster includes re-calculating the density score for remaining points within one or more cluster windows in the second list due to removal from consideration the select ones of the points that are included in the cluster. The re-calculating causes re-organization of the remaining points in the corresponding one or more cluster windows within the second list, based on the re-calculated density score.

In some implementations, generating the cluster includes generating a second cluster for a next point in the second list for the cluster window upon confirming that the re-calculated density score of the next point is above a predefined minimum threshold value.

In some implementations, generating the cluster for each point in the first list includes identifying a second cluster window for a second point in the first list. The second cluster window is identified by sliding the cluster window from the point to the second point along the latitude. The second cluster window includes one or more points with latitudes that are within the predefined clustering distance. One of the points (i.e., either the second point or one of the other points) in the second cluster window is identified as the cluster center for a second cluster, based on the density score computed for the different points in the second cluster window. The second cluster is created by including select ones of the points in the second list that are within the predefined clustering radius defined by the predefined clustering distance from the cluster center of the second cluster. The inclusion of the select ones of the points in the second cluster causes removal of these points from consideration in the network space.

In some implementations, the second cluster is generated when the density score of the point defining the cluster center of the second cluster is above the predefined minimum threshold value.

In some implementations, computing the density score includes incrementing the latitude to a next latitude, the next latitude identified based on distribution of the plurality of points in the network space, identifying a cluster window for a next point along the next latitude, and computing the density score of all points in the cluster window identified for the next point along the next latitude.

In some implementations, generating the cluster includes identifying one or more straggler points included within one or more cluster windows defined for the network space, and associating each one of the one or more straggler points to specific one of the clusters generated for the plurality of points in the network space, based on proximity of the straggler points from the corresponding cluster. The straggler point is a point that is located outside of the predefined clustering radius of a cluster center of the corresponding cluster window.

In some implementations, one or more points in the network space represent a sub-net address, wherein each sub-net address identifies one or more client devices.

In some implementations, the density score computed for a point that corresponds to a sub-net address takes into consideration the one or more client devices that are part of the sub-net.

The claimed implementations described herein engage a clustering algorithm that is used to identify density based clusters that uses simple distance calculations to identify density score of the different points in the IP space and use the Haversine distance computing after local optimal cluster windows have been identified, thereby minimizing the run-time considerably while ensuring that these clusters correctly model areas in the network space that have similar network paths and/or other characteristics. Such density-based clustering is relevant as they can be used to accurately identify areas where performance bottlenecks are occurring or can occur so that proactive steps can be taken to address the issues, or to identify areas where network characteristics can be improved.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings.

FIG. 3J illustrates a sample cluster window with an alternate distribution of different points that identifies a new cluster center, in accordance with an embodiment of the present invention.

DETAILED DESCRIPTION

Figure 1:
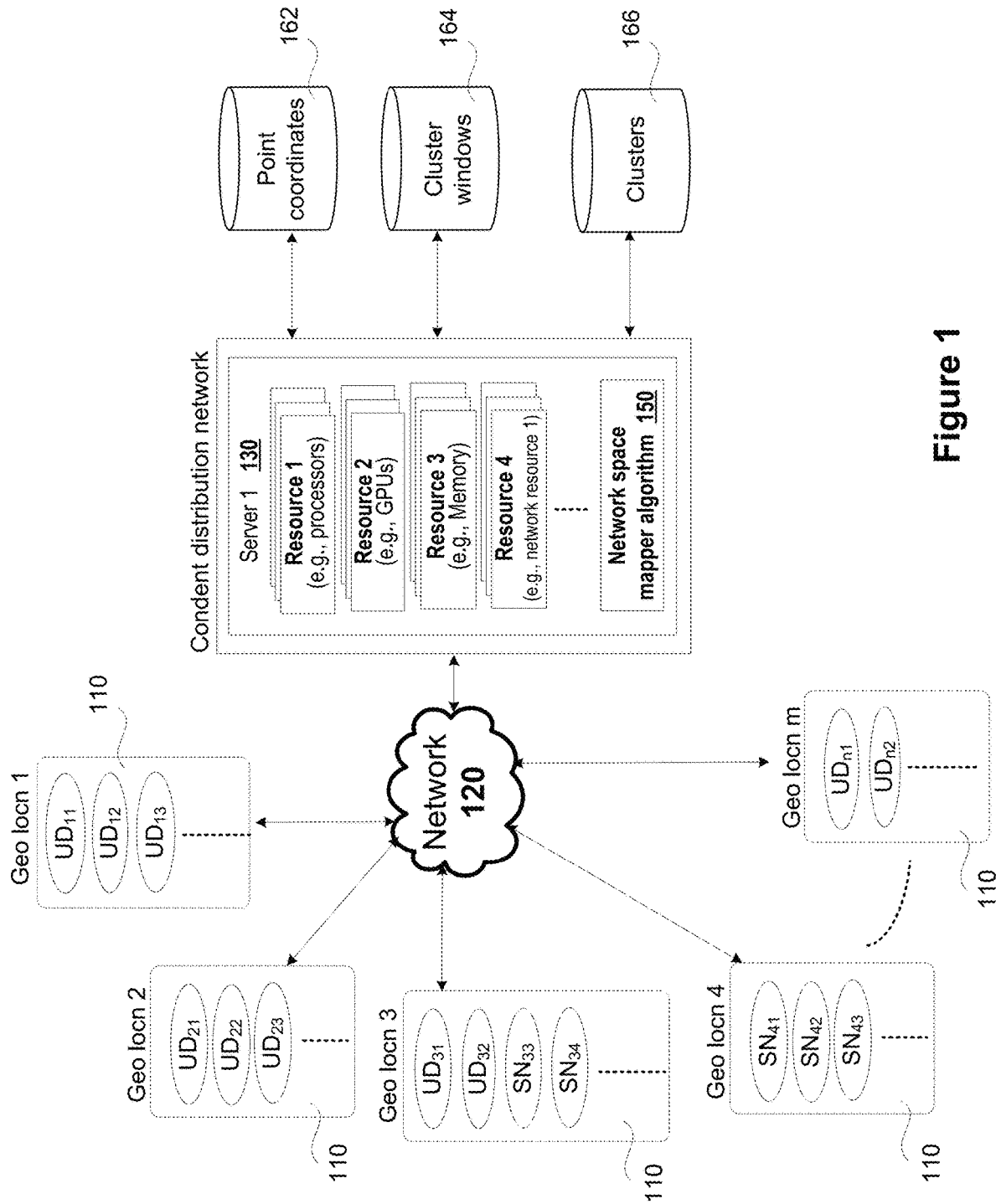
FIG. 1 illustrates a simplified block diagram of a content distribution network system that includes a plurality of client devices requesting content from a content distribution server over a network, in accordance with an embodiment of the present invention.

Embodiments of the present invention provide a system, computer readable storage media storing clustering algorithm, and methods for efficiently mapping client devices within a network space to define clusters of high density and using network characteristics associated with each cluster to improve services to the client devices distributed across the network space.

The clustering algorithm computes density score of each point in the network space corresponding to at least one client device by first organizing the points in accordance to latitudinal coordinates, defining a cluster window for each point in a given latitude with boundaries defined by pre-defined clustering distance, determining density score of each point in the cluster window, and using a specific point with the highest density score within the cluster window as a cluster center and generating a cluster. The points that are included in the cluster are not considered for any other cluster that is generated for the network space. To decrease the runtime of the clustering algorithm, the cluster windows for each point are defined using a sliding window concept, wherein points along given latitude are used to define cluster windows before progressing to the next latitude. The run-time is further reduced by identifying local cluster windows, identifying a cluster center from the local cluster window, and associating the points of the one or more cluster windows with the cluster. Any points that fall outside of the cluster are associated with a cluster based on the proximity of those points to the respective cluster.

The clustering algorithm described herein identifies client devices of users using internet protocol (IP) addresses. Identifying users by IP addresses and clustering them in accordance to the IP addresses within the same geo region is useful in order to analyze the performance of networks across the world (i.e., network space). As network characteristics for a given geographical area are similar in nature, density-based clustering provides a better understanding of network characteristics in different areas by guaranteeing splits that group similar users into meaningful geo-clusters, so that network issues and/or other related performance issues (e.g., network bottlenecks, such as round trip time latencies, etc.,) can be identified and addressed in a fast and efficient manner. For instance, the density based clusters can be used to identify client devices in different networks and/or ISPs within a given cluster and to determine the performance metrics of the client devices in the given cluster. Usually the client devices within a given geo region have similar network performance. Thus, using each cluster's information it is easier to identify discrepancies in the network performance between clients within a geo cluster that are in different networks and/or ISPs, and address it in a timely manner, so as to provide optimal experience for the users.

With the general understanding of the invention, detailed description of the various embodiments will now be described with reference to the drawings.

FIG. 1 illustrates a content distribution network system 100 that is used for mapping client devices within a network space, in one implementation. The content distribution network system 100 includes a plurality of client devices 110 that communicates with a server computing device, such as a content distribution server 130, via network 120, such as an Internet, to request and obtain content. The client devices can be any type of computing device that is connected to the network 110 through wired or wireless connection. The client devices 110 may be any one of a laptop computer, a desktop computer, a tablet computing device, wearable computing devices, such as head mounted displays/glasses, watches, etc., thin clients, mobile computing devices, wired or wireless controllers, or any other computing devices that are equipped with a network interface and are capable of connecting to the network. The client devices 110 provide a user interface (not shown) for a user to provide user authentication information and to request access to content on the content server 130.

The content server 130 can be any server computing device including a stand-alone computer, a network of computers, a virtual machine, a network of virtual machines, part of a cloud computer network, etc., and is configured to connect to the network 120, so as to communicate with the client device 110. The server 130 may be a host content server that provides articles of content or may be a content accumulator that interacts with a plurality of content sources to accumulate, aggregate articles of content from different content sources and provide the articles of content. The articles of content may include multimedia content, such as streaming content, textual content, video content, television content, game content, promotional media content, graphical user interface (GUI) content, audio content, social media content, pictures, photos, weblogs, broadcast content, or any other content that can be rendered on a client device for user consumption.

Requests for content from the client devices may be temporal based or geo-location based or event-based or may be based on social media activities or may be based on any other trigger event/activities associated with users and/or content. Demand for different content may overwhelm the system leading to significant round trip time latencies, thereby delaying access to the content. Such delay can lead to unsatisfactory user experience.

Identifying users using IP addresses of client devices within different geo regions where such demand to content are occurring or is anticipated to occur due to occurrence of trigger events, is useful in order to analyze the performance of networks across the IP space (i.e., world). The clustering algorithm engaged within the content server efficiently generates meaningful geo-clusters by clustering users with cluster centers in highly dense areas, thereby guaranteeing splits that group similar users together. The clustering algorithm performs such meaningful geo-clusters in an efficient manner by reducing search space within the network geography. The search space is reduced by using a sliding window approach to minimize the number of points under consideration and relaxing constraints of clustering by finding local optimal clusters instead of global optimal clusters. Using these optimizations, runtime is greatly reduced. Further reduction in runtime is achieved by performing simple distance calculation when identifying high density areas and localizing Haversine distance computation for points within each local cluster.

The server may use one or more databases to store details of the client devices (e.g., spatial coordinates expressed in terms of latitudes, longitudes) distributed across the IP space and use the details in generating meaningful clusters. Separate databases may be used to store coordinates of the different client devices (e.g., point coordinates datastore 162), information related to cluster windows defined for the different points (e.g., cluster windows datastore 164) and clusters (e.g., clusters 166) generated using the points in the cluster windows, or the details may all be stored in a single datastore.

Figure 2:
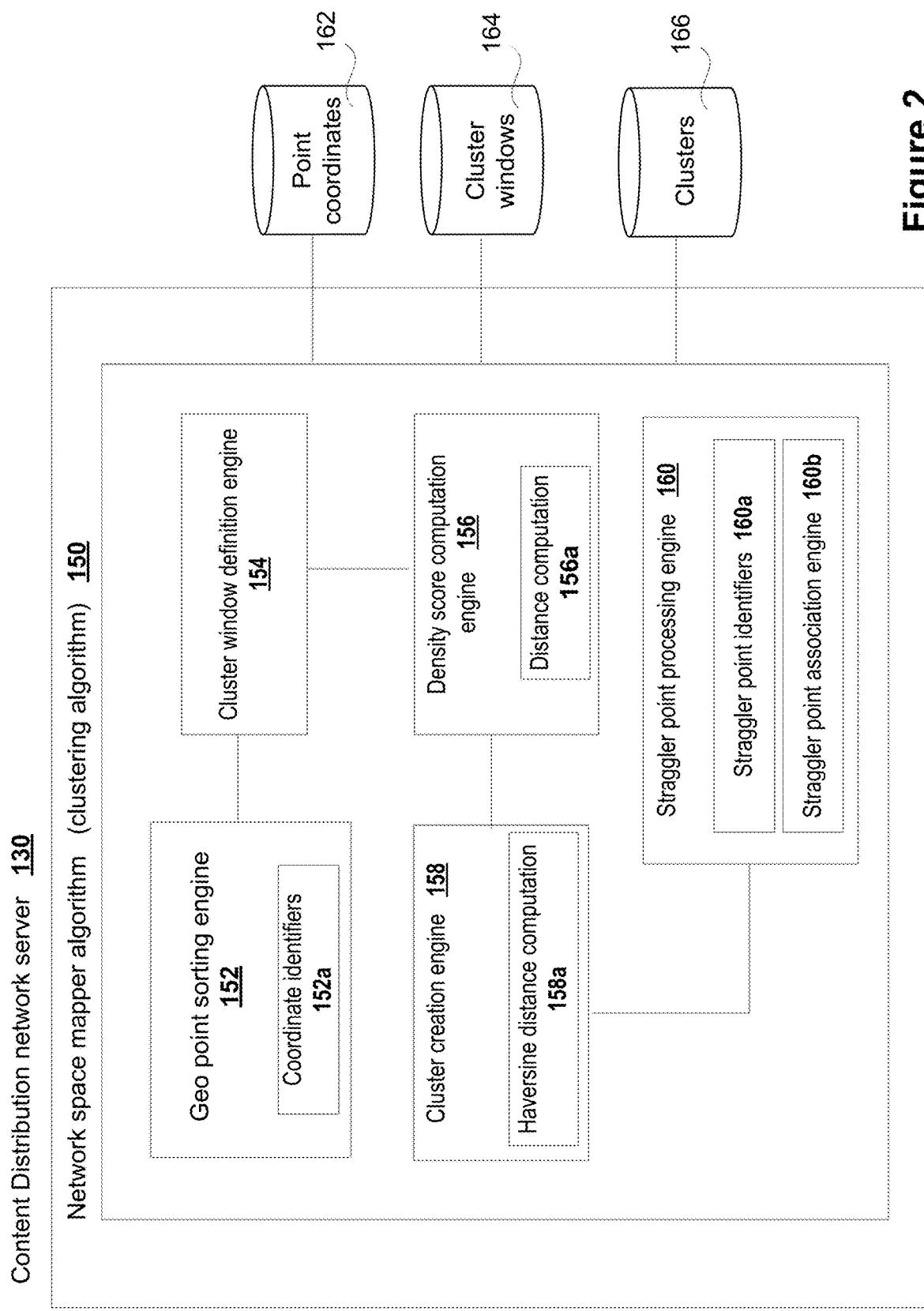
FIG. 2 illustrates a simplified block diagram of a content distribution server that includes a clustering algorithm, such as a network space mapper, to map client devices within a network space, in accordance with an embodiment of the present invention.

FIG. 2 illustrates the various modules of the clustering algorithm (network space mapper 150) that is used to generate density based clusters of client devices that are distributed over the network space, in one implementation. The network space mapper 150 may be executed on a single content distribution network server 130 or may be executed on multiple servers 130. Some of the modules that are used to generate the density based clusters include geo point sorting engine 152, cluster window defining engine 154, density score computation engine 156, cluster creation engine 158 and a straggler point processing engine 160, to name a few. The aforementioned modules are not to be considered as exhaustive or limiting and fewer or additional modules may be used to map the client devices in the network space.

The geo point sorting engine 152 is configured to identify a plurality of points distributed across the network space, wherein each point represents one or more client devices. For instance, a point may correspond to a sub-net address, with the sub-net address relating to one or more client devices. Each of the client devices is identified using an internet protocol (IP) address and each IP address corresponds to spatial coordinates. In some implementation, the spatial coordinates are represented by latitudes and longitudes. The implementations are not restricted to representing the client devices using latitudes and longitudes and that other forms of geo location representation may also be used. A coordinate identifier engine 152a of the geo point sorting engine 152 is used to identify the spatial coordinates of the points and use the spatial coordinates to organize the points in the network space by latitude into a first list. In some implementations, the geo point sorting engine 152 stores the spatial coordinates of the different client devices in a point coordinates datastore 162 and shares the spatial coordinates of the points with other modules of the network space mapper (clustering algorithm) 150.

A cluster window definition engine 154 selects each point from the first list and defines a cluster window. The cluster windows are defined for points along a first latitude before proceeding to the next latitude and defining cluster windows for all the points along the next latitude, and so on. A size of the cluster window is defined by a predefined clustering distance. In one implementation, the clustering distance may be set to be about 50 miles or 100 miles. In another implementation, the clustering distance is set based on the density of distribution of the client devices. Of course, the aforementioned clustering distance is provided as a mere example and should not be considered restrictive. In some implementations, the cluster distance may be initially set to a certain distance and may be adjusted periodically based on density of distribution of the points in the network space. The clustering distance is used to define a boundary encompassing a geographical area with a beginning point and an end point. In some implementation, the cluster window is identified to be a square area encompassing a plurality of points from the network space with latitudinal coordinate that is less than the set clustering distance from the point for which the cluster window is being defined. It should be noted that the points referred to herein correspond to one or more client devices distributed across geographical area representing the network space.

Figure 3:
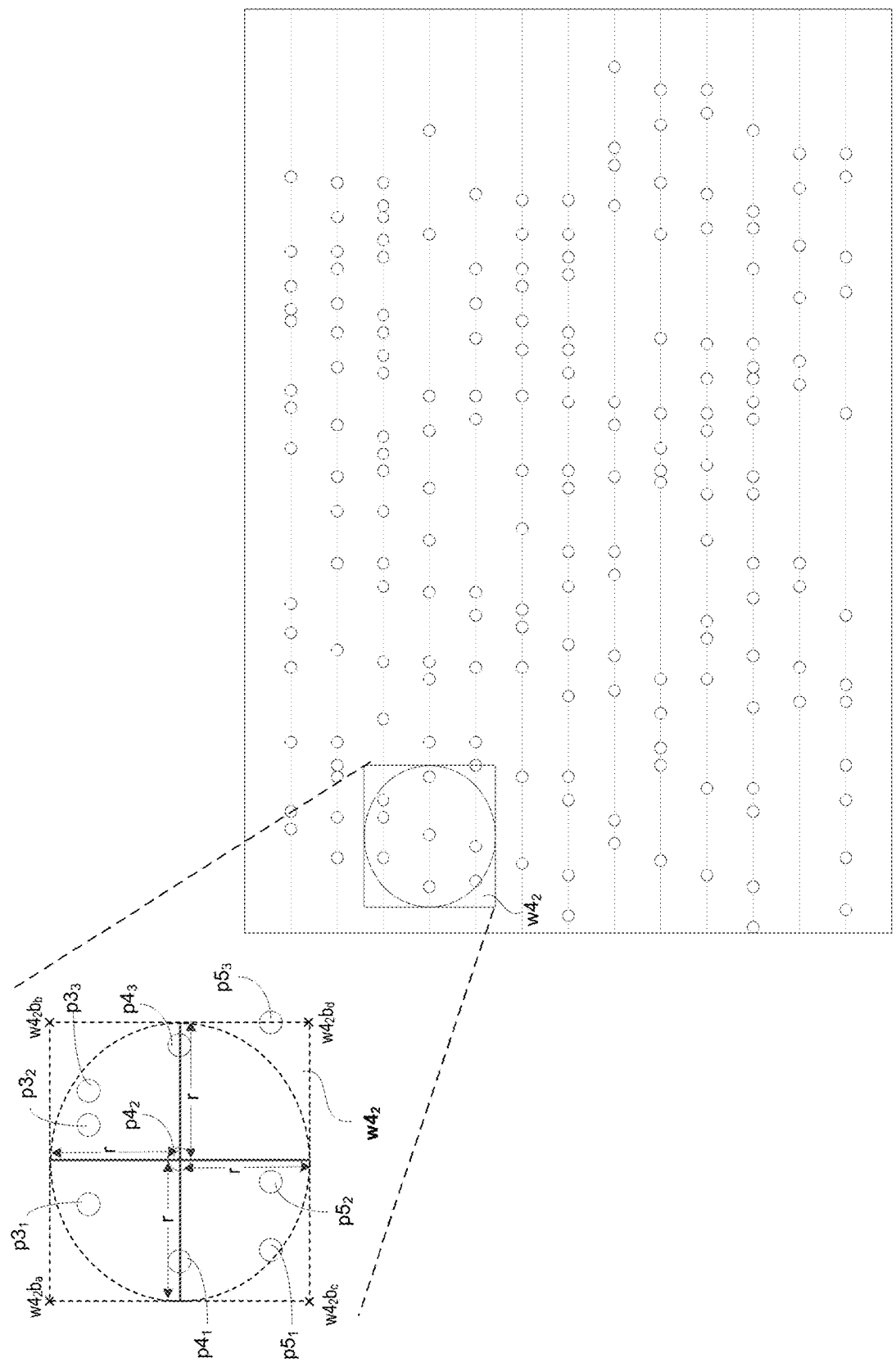
FIG. 3 illustrates a sample distribution of client devices within a network space that is used to identify cluster windows, in accordance with an embodiment of the present invention.

FIG. 3 illustrates a sample cluster window defined for a point along a latitude. As shown, a cluster window $w4_2$ is defined for a point $p4_2$ along a first latitude. Point $p4_2$ may be the first point along the first latitude for which the cluster window is being defined. The cluster window $w4_2$ encompasses a square area with a boundary defined by boundary coordinates $w4_2b_a$ through $w4_2b_d$. The size of the cluster window $w4_2$ is defined by a clustering distance 'r' that may be a distance that is predefined, in some implementations. In other implementations, the predefined clustering distance may be set as a default and may be changed depending on the density of the distribution of the client devices. The cluster window for point $p4_2$ includes other points whose latitudes are within the clustering distance. For example, points $p3_1$, $p3_2$, $p3_3$, $p4_1$, $p4_3$, $p5_1$, $p5_2$, and $p5_3$ are shown to have latitudes that are within the clustering distance of point $p4_2$. The next cluster window is defined by sliding the cluster window along the first latitude from point $p4_2$ to the next point $p4_3$ and defining a second cluster window for point $p4_3$, and so on. Once the cluster window has been defined for all points along the first latitude, the cluster window definition engine 154 increments the latitudinal coordinate to the second latitude and starts defining cluster window for each point along the second latitude before proceeding to the third latitude and so on. The latitudinal coordinate may be identified based on the distribution of the client devices in the network space. Identifying the points using latitudinal coordinates is preferable than identifying points using longitudinal coordinates as distance between the latitudes are more uniform than the distance between longitudes (due to convergence of the longitudes near the poles).

Information related to the boundary coordinates of each cluster window defined for each point on each latitude and the points with latitudinal coordinates that fall within the boundary of the respective cluster window are stored in the cluster windows datastore 164 by the cluster window definition engine 154 and shared with other modules of the network space mapper 150.

Referring back to FIG. 2, a density score computation engine 156 within the network space mapper 150 uses the information stored for each cluster window to compute density score for each of the points included within and to determine a cluster center for each cluster window. For example, the density score computation engine 156 uses the information related to a first cluster window defined for a first point to identify all the other points that are included within the first cluster window. The density score computation engine 156 then computes density score for each of the points within the first cluster window. To compute the density score of a point in the cluster window, the density score computation engine 156 determines other points that fall within a clustering radius of the point. The clustering radius is defined by the clustering distance. The density score computation engine 156 may use distance computation module 156a to identify other points that are within the clustering radius of each point within the cluster window. The distance computation module 156a, in one implementation, performs a simple, Euclidian distance calculation to identify other points within the clustering distance of each point. The implementations are not restricted to just Euclidian distance calculation but can use any other distance calculation algorithm/logic to determine distance between two points.

Figure 3B:
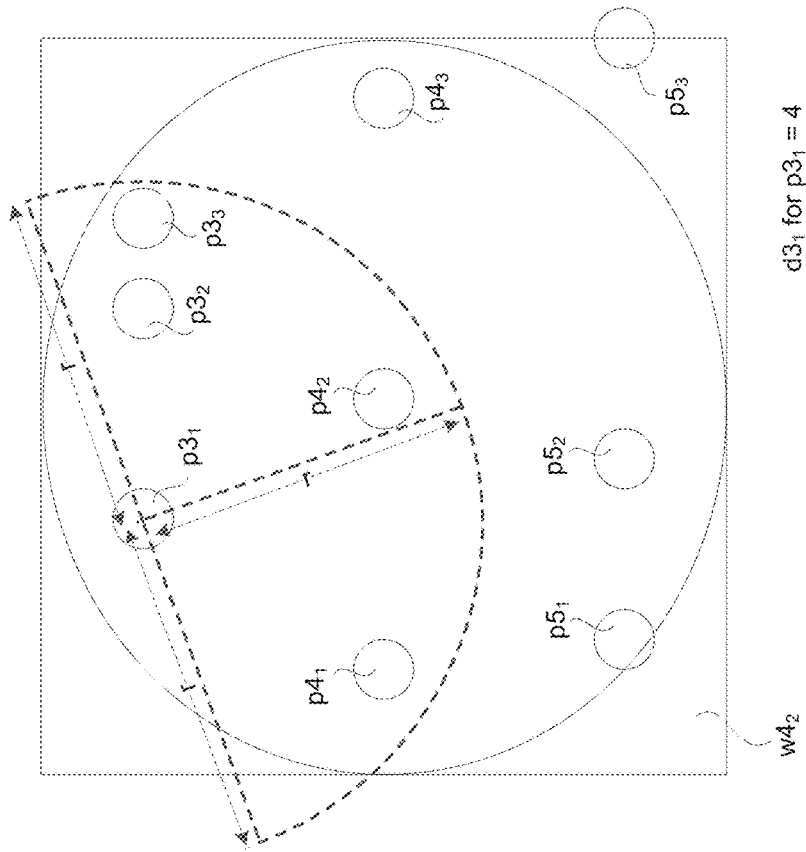
FIGS. 3A-3I illustrate sample cluster windows identifying distribution of different points used for determining density scores, in accordance with an embodiment of the present invention.
Figure 3A:
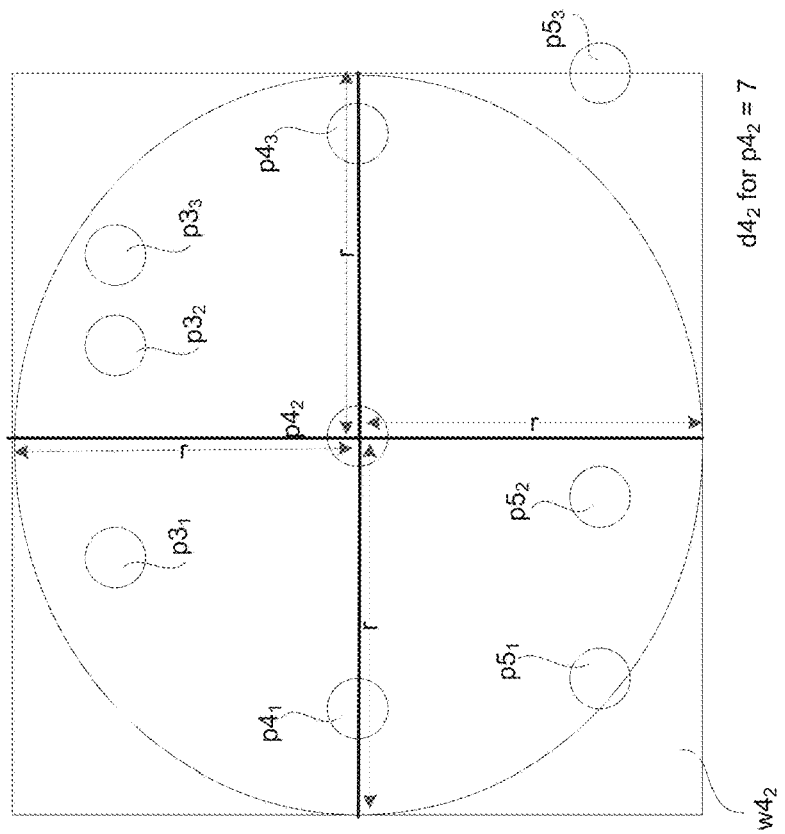
Figure 3D:
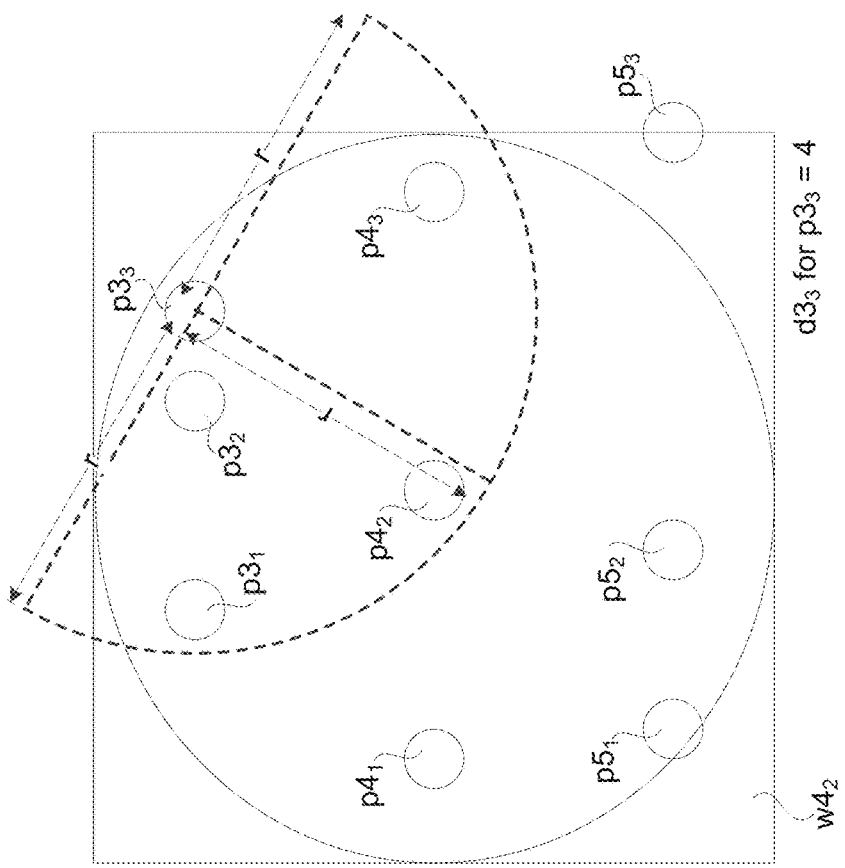
Figure 3C:
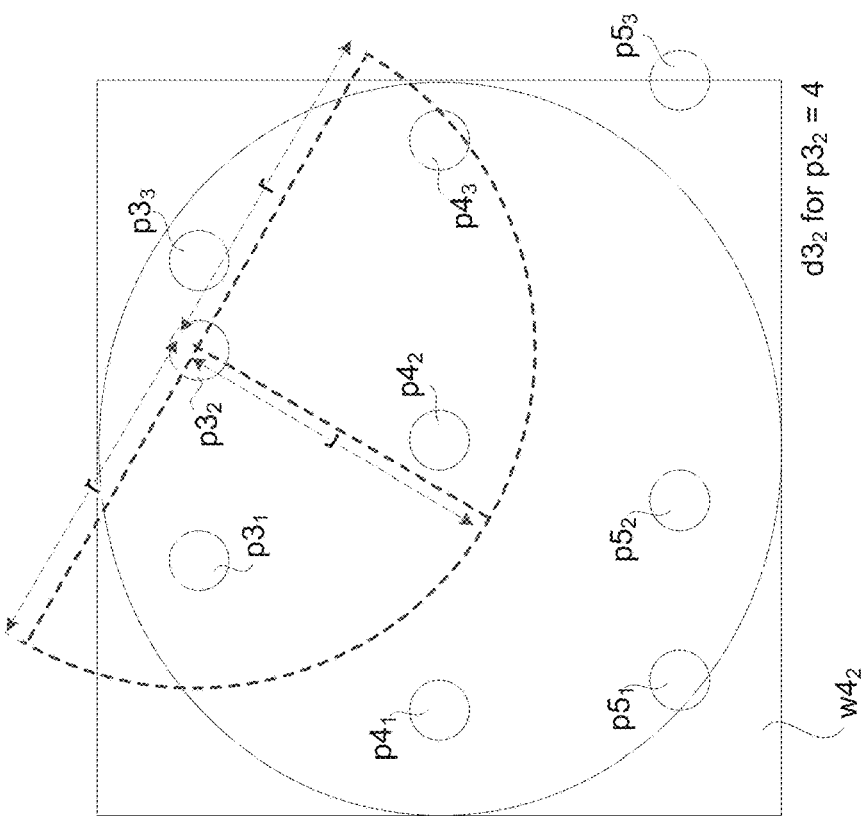
Figure 3F:
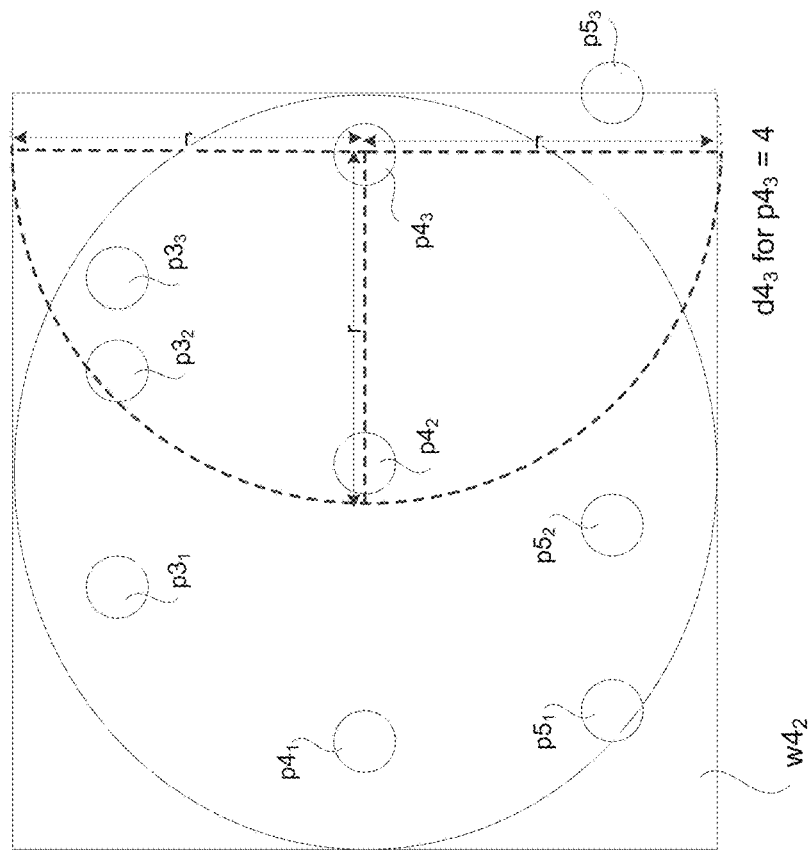
Figure 3E:
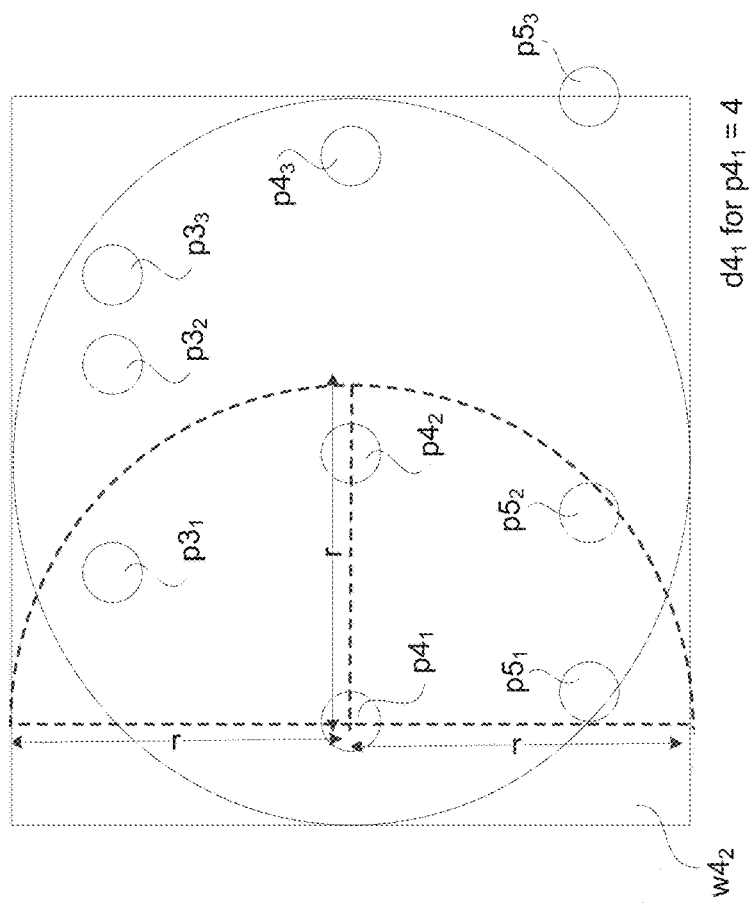
Figure 3H:
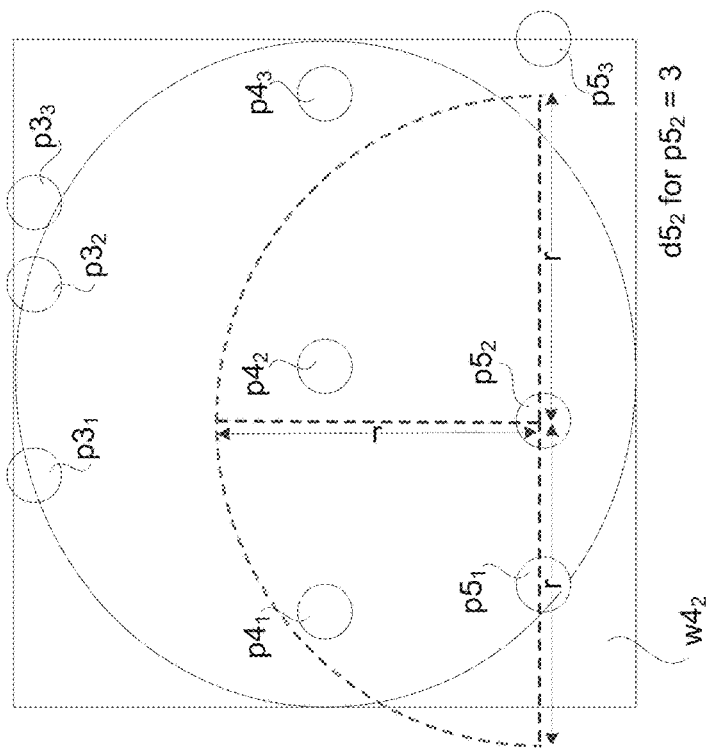
Figure 3G:
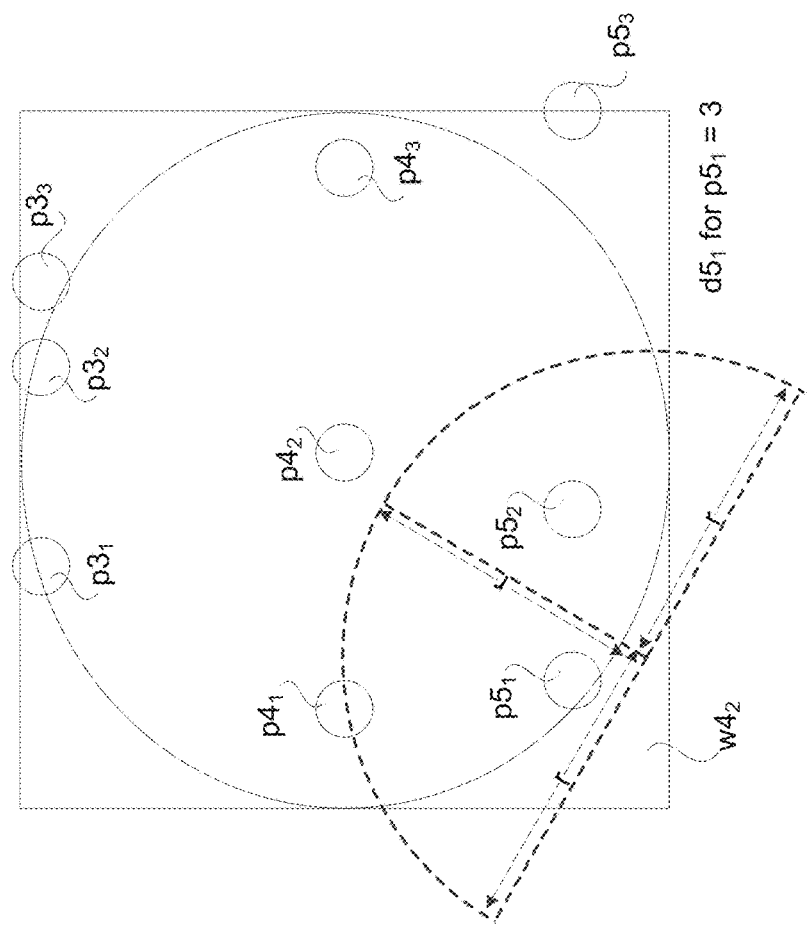
Figure 3I:
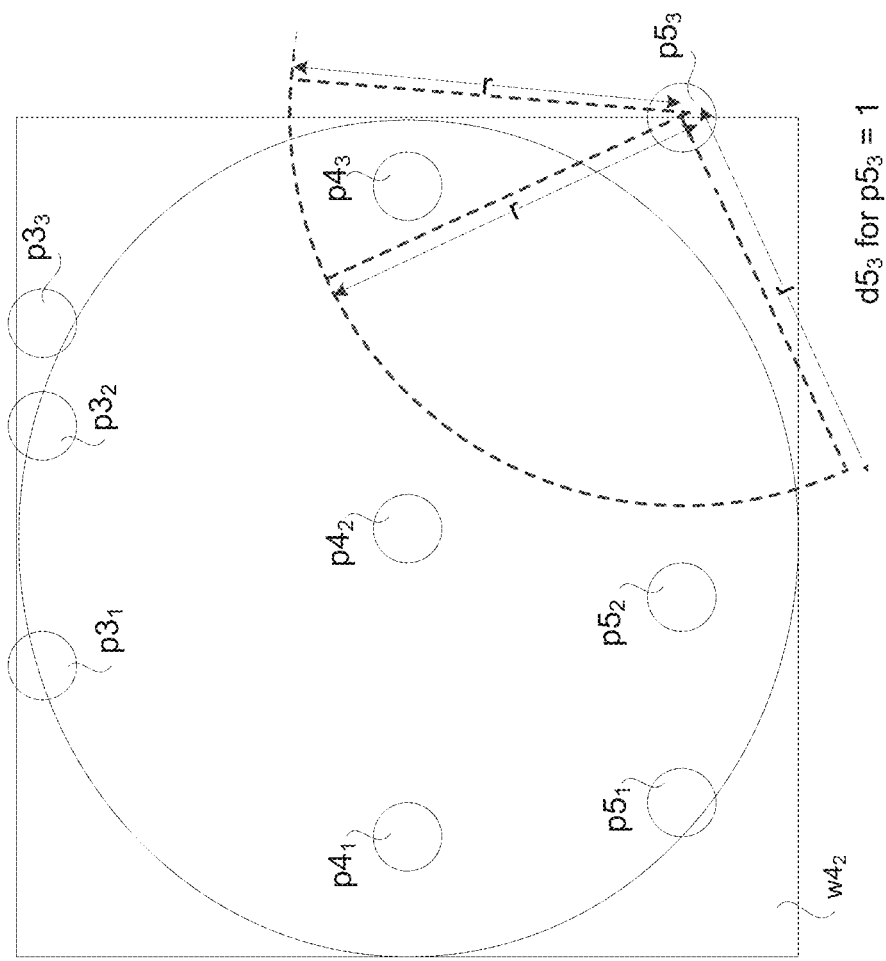

FIGS. 3A-3I illustrate one such example for computing density score for each point within a first cluster window defined for a first point on a first latitude, in one implementation. It should be noted that FIGS. 3A-3I illustrate a very simplified distribution of client devices within a geographical area covered by cluster window $w4_2$. For example, FIG. 3A shows the cluster window $w4_2$ defined for point $p4_2$ disposed along one of the latitudes. The example illustrated in FIG. 3A is similar to the one shown in FIG. 3. The density score for point $p4_2$ is defined by identifying other points that are within a clustering radius defined by the clustering distance 'r', wherein the distance is determined using simple Euclidian distance calculation between two points. Based on this computation, the density score of point $p4_2$ is shown to be 7 based on the points $p3_1$, $p3_2$, $p3_3$, $p4_1$, $p4_3$, $p5_1$ and $p5_2$ that are within the clustering radius 'r' of point $p4_2$. In order to provide a basic understanding of how the density score is computed, FIGS. 3A-3I are shown to include points from only cluster window $w4_2$ whereas in reality the density score of each point is computed using other points from neighboring cluster windows. Thus, the portion of circles that are drawn around different points in FIGS. 3A-3I would actually be complete circles that also include other points from neighboring cluster windows, where appropriate. The concept of identifying and including other points from neighboring cluster windows is shown and described with reference to FIG. 4. After computing the density score of point $p4_2$, the density scores of other points within the cluster window $p4_2$ are determined in a similar manner. For example, FIG. 3B illustrates the density score of point $p3_1$ being determined based on the distance of other points within the cluster window $w4_2$ falling within clustering radius 'r' and is shown to be 4. Similarly, as shown in FIGS. 3C-3F, the density scores of points $p3_2$, $p3_3$, $p4_1$ and $p4_3$ are each computed and is shown to be 4. Similarly, as shown in FIGS. 3G and 3H, the density score of each of the points $p5_1$ and $p5_2$ is shown to be 3, and as shown in FIG. 3I, the density score of point $p5_3$ is shown to be 1. The density score of each of the points within a cluster window is stored in the cluster windows datastore 164 and used to organize the points into a second list. The second list, in one implementation, is organized with the point within the cluster window $w4_2$ having the highest density score being at the top of the list. In the example illustrated in FIGS. 3A-3I, the point with the highest density score is point $p4_2$ with density score of 7. As a result, point $p4_2$ will become the cluster center for cluster window $w4_2$.

FIG. 3J illustrates an alternate distribution of points within a cluster window $w4_2'$, wherein the number of points that are included within the cluster window $w4_2'$ are mostly located at the boundary between adjacent cluster windows. When density score is computed for the points in the cluster window $w4_2'$, the density score of point $p5_1$ is shown to be higher (i.e., density score of point $p5_1$ is 15) than the density score of point $p4_2$, which is 7. When the second list is generated for the cluster window $w4_2'$, point $p5_1$ may be at the top of the list based on the density score of all the points in the cluster window $w4_2'$. In the examples illustrated in FIGS. 3A-3J, each point is shown to correspond to only one client device. However, if any one or more of the points relates to a sub-net address with each sub-net address having a plurality of client devices, the density score of the different points in the cluster window will take into consideration the number of client devices within respective sub-net address.

Referring back to FIG. 2, the second list of points with the corresponding density scores is provided to a cluster creation engine 158. The cluster creation engine 158 selects a first point of the first cluster window (e.g., $w4_2$ for point $p4_2$ of FIG. 3) with the highest density score in the second list and generates a first cluster with the first point as the cluster center of the cluster window. The cluster creation engine 158 then determines Haversine distance of each of the other points from the cluster center. Haversine distance is a distance computation formula that is used to determine circular distance between two points using their latitudinal and longitudinal coordinates. Based on the Haversine distance computation, the cluster creation engine 158 considers those other points whose Haversine distance falls within the clustering radius of the first point (i.e., the cluster center) in the cluster window. Once the first cluster is generated, the points that were included within the first cluster are no longer available when creating other clusters as these points have already been accounted under the first cluster. As a result, upon creating the first cluster, in one implementation, the cluster creation engine 158 works with the density score computation engine 156 to re-compute the density score of select ones of the remaining points in the second list identified that are associated with one or more of the cluster windows from which points were used to create the first cluster. Re-computation of the density score may be necessary as the density scores of some of the remaining points may be affected due to select ones of the points being accounted under the first cluster and being no longer available for consideration. In this implementation, re-computation of the density score of select ones of the remaining points in the second list results in the re-organization of some of the points in the second list based on the re-computed density scores of the select ones of the remaining points.

In an alternate implementation, once the first cluster is created, a flag may be sent to the cluster creation engine 158 to use a second point in the second list with the next highest density score as the next cluster center and proceed to create a second cluster. In this implementation, there is no need to re-compute the density score of the remaining points in the cluster windows from which select ones of the points were used to create the first cluster. Since areas of high density are often tightly concentrated in large cities, this alternate implementation works well without compromising on the quality of clustering or distorting the cluster formation. FIG. 4A illustrates one such high density area that is within a metropolitan area.

Figure 4:
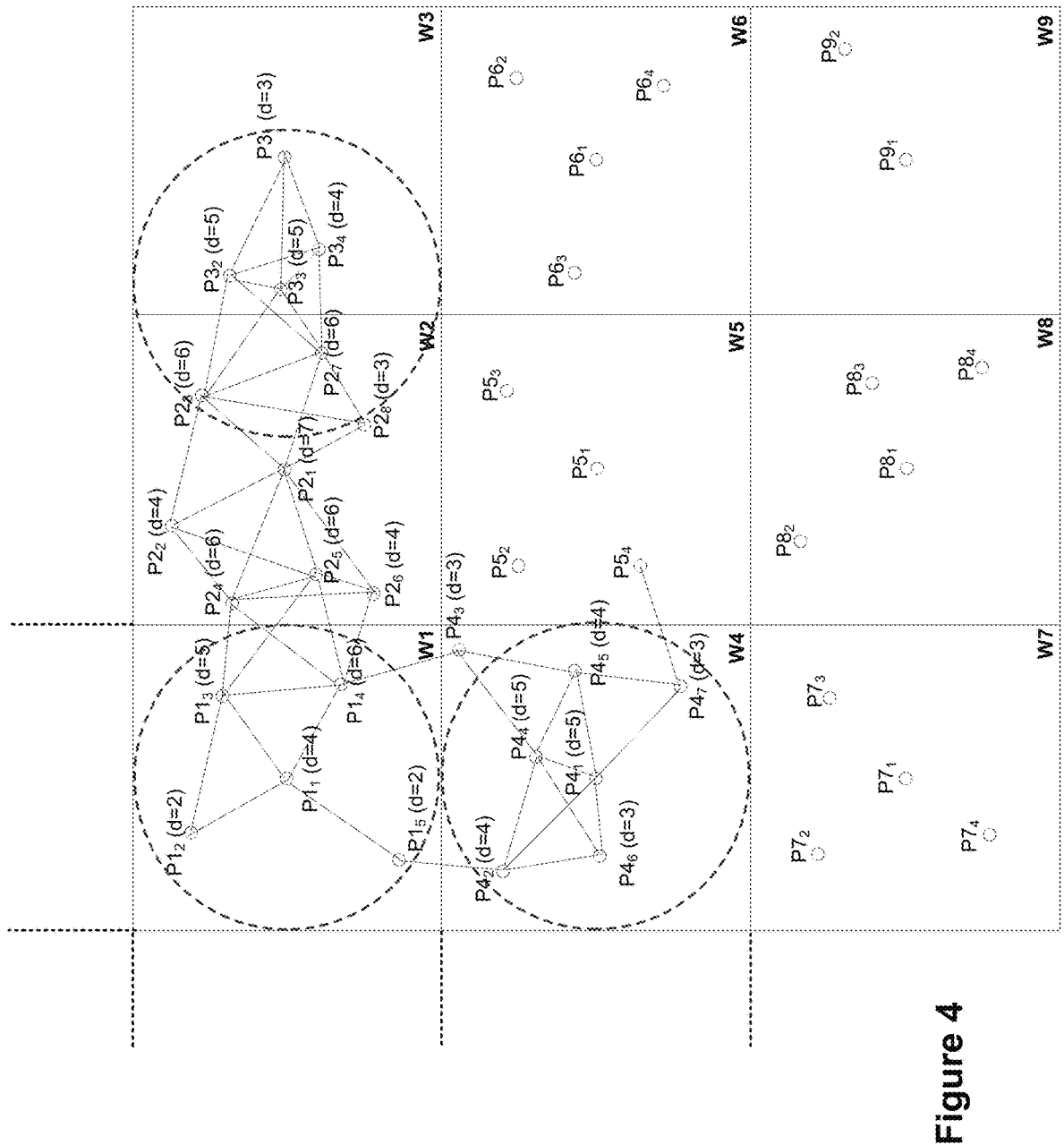
FIG. 4 illustrates a simplified view of a group of cluster windows identified in a portion of the geographical area that is used for creating clusters, in accordance with an embodiment of the present invention.
Figure 4A:
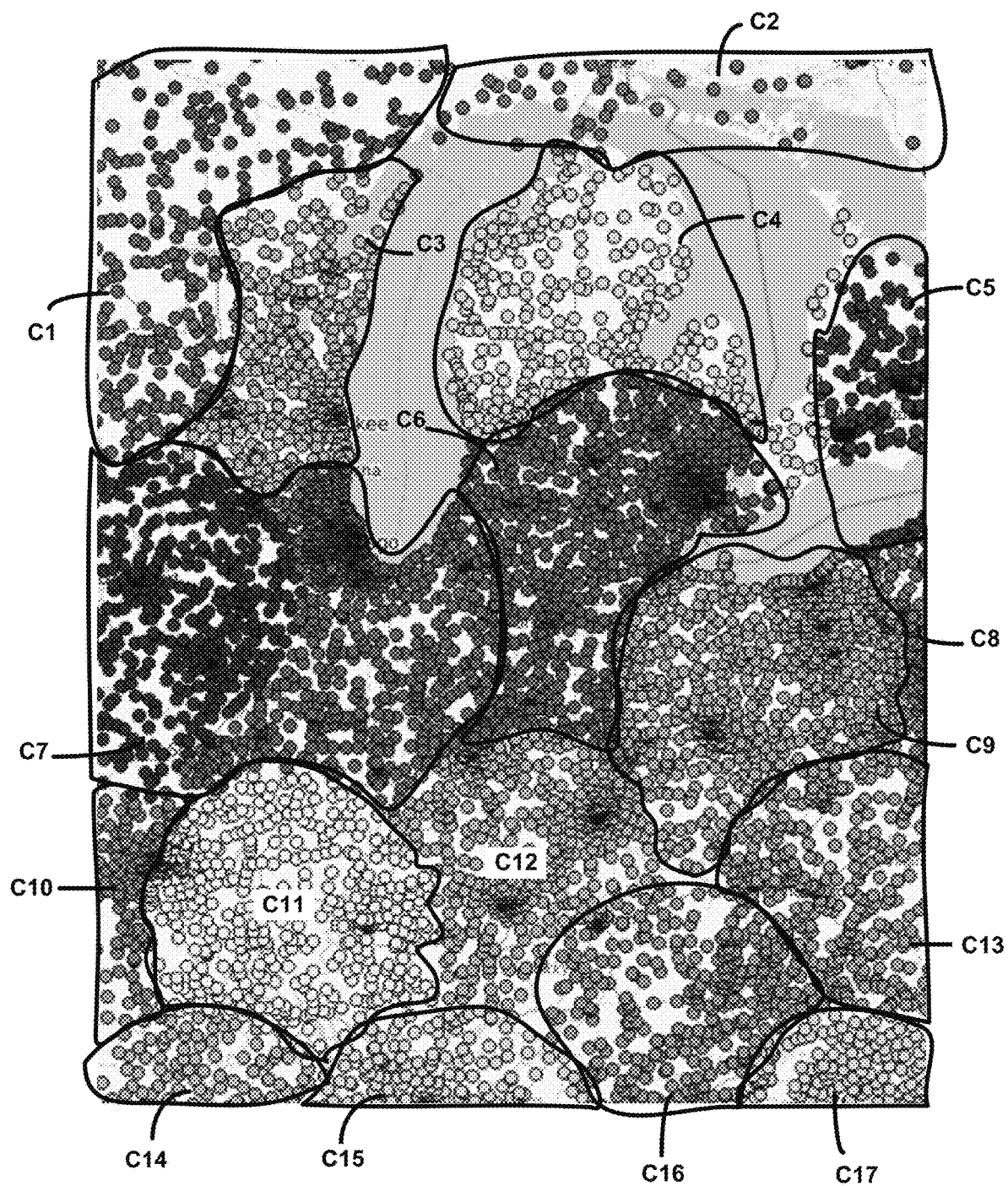
FIG. 4A illustrates sample clusters generated for a portion of the geographical area using the network space mapper algorithm described herein, in accordance with an embodiment of the invention.

FIG. 4 illustrates an example of a process followed for creating clusters by computing density scores of points within each cluster window and re-organizing points in the second list after creating each cluster and re-computing the density scores of certain ones of the points in the second list. The distribution of points in a portion of the geographical area (i.e., network space or IP address space) illustrated in FIG. 4 shows a very simplified distribution with very few points, whereas in reality hundreds or even thousands of points may be distributed in that portion with each point representing one or more client devices. As shown in FIG. 4, a plurality of cluster windows, w1-w9 are shown with a number of client devices, represented by points, distributed throughout the different cluster windows. For example, cluster window w1 is shown to include points $p1_1$-$p1_5$, cluster window w2 is shown to include points $p2_1$-$2_8$, cluster window w3 is shown to include points $p3_1$-$p3_4$, cluster window w4 is shown to include points $p4_1$ through $p4_7$, and so on.

Upon identifying the cluster windows with sizes defined by clustering distance, density scores for each point in each cluster window are computed starting with a first point along a first latitude and proceeding to a subsequent point along the first latitude till density scores of all points along the first latitude have been computed before incrementing to the next latitude and repeating the density score computation process. The density score is computed, for example, by counting the number of edges drawn between a point and each of the other points that are within clustering radius of the point. For illustration purposes, in the example illustrated in FIG. 4, density score of points within cluster windows w1-w4 have been shown, whereas in reality the clustering algorithm computes density score of each point in each of the cluster windows. For illustration purposes, some of the points in cluster windows w1-w4 have been shown with circular areas that include other points that are within clustering radius from the corresponding points that each act as the center covering the circular area. The number of other points that are within each circular area are used to compute the density score of the point that is the center of the circular area. For example, the circular area defined for point $p1_2$ identifies two other points, $p1_3$ and $p1_1$ within the clustering radius. As a result, the density score of point $p1_2$ is 2. Density score of other points in the cluster windows w1-w9 are calculated in a similar manner. Although the density score of point $p1_2$ is shown to include other points within the same cluster window, it should be noted that the density score of some of the points in a cluster window may include points from neighboring cluster windows. For example, density score for point $p3_3$ in cluster window w3 is shown to include points from both cluster windows w2 and w3, as shown by the circular area that is drawn with point $p3_3$ as its center.

Based on the density score computed for each point in cluster window w1, point $p1_4$ is shown to have the highest density of 6 followed by point $p1_3$ with density score of 5, point $p1_1$ with density score of 4, and each of points $p1_2$ and $p1_5$ with density score of 2. It should be noted that one or more of the points may represent a sub-net address, with each sub-net address including more than one client device. When certain ones of the points represent a sub-net address, the density score of points that include the certain ones of the points with sub-net address will take into consideration the number of client devices in the respective sub-net address(es). To keep it simple, in the example illustrated in FIG. 4, each point is shown to represent a client device and not a sub-net address with plurality of client devices. As a result, the density score is computed accordingly. Based on the density score of each point in a cluster window, the cluster center may be different from the point for which the cluster window was defined. As noted above, the density score of each point in the cluster window may include other points from one or more neighboring cluster windows. Taking a point from the first cluster window with the highest density score, a cluster is created with the point as the cluster center and including other points that were included when the density score of the point was computed. In the example illustrated in FIG. 4, point $p1_4$ with the highest density score of 6 is designated as the cluster center for cluster 1 (C1) that is created for cluster window w1 even though the cluster window w1 was defined for point $p1_1$ with boundary for the cluster window w1 defined at a clustering distance from point $p1_1$. Cluster C1 includes points $p1_1$, $p1_3$ from cluster window w1 and other points from neighboring cluster windows, such as points $p2_4$, $p2_5$, $p2_6$ from cluster window w2, and point $p4_3$ from cluster window w4.

Once the cluster C1 is formed, density scores of the remaining points in the cluster windows from which points were included to create cluster C1 are re-computed and the second list is re-organized for each of the affected cluster windows, in one implementation. When re-computing the density scores and re-organizing the second list, the network space mapper 150 optimizes on the number of density scores that it has to re-compute after creating the cluster C1 by identifying a subset of cluster windows whose points need to have their density score re-computed. The subset of cluster windows is identified as specific ones of the cluster windows that are associated with the points that were included when creating cluster C1. Thus, in the example illustrated in FIG. 4, once cluster C1 is created with $p1_4$ as the cluster center, the density scores of the remaining points in only cluster windows w1, w2 and w4 are re-computed while the density scores of the points in the remaining cluster windows w3 and w5-w9 remain unchanged. Further, since some of the points from the specific ones of the cluster windows have already been accounted under cluster C1, only a subset of points within each of the identified subset of cluster windows w1, w2 and w4 need to have their density scores re-computed, further reducing the number of re-computations that need to be performed. For instance, in the example shown in FIG. 4, the density scores of the remaining points—i.e., points $p1_2$ and $p1_5$ from cluster window w1, points $p2_1$, $p2_2$, $p2_3$, $p2_7$ and $p2_8$ in cluster window w2, and points $p4_1$, $p4_2$, $p4_4$, $p4_5$, $p4_6$ and $p4_7$ in cluster window w4 are re-computed.

The points in remaining cluster windows w3 and w5-w9 need not have to be re-computed as none of the points in these cluster windows were included when creating the cluster C1. Upon completion of density score re-computation in the affected cluster windows, the second list of points is re-organized for each of the respective cluster windows. As a result of re-computation, the re-computed density score of point $p1_2$ will be zero as the points within the clustering radius were all accounted under cluster C1, while the density score of point $p1_5$ remained the same at 2. Based on the re-computed density score of the remaining points in cluster window w1, the points $p1_5$ and $p1_2$ are re-organized in the second list for the cluster window w1 so that point $p1_5$ with density score 2 is higher than point $p1_2$ with a density score of zero.

As previously stated, in some implementations, the clustering algorithm may send a signal or a flag to the cluster creation engine 158 to continue creating clusters by going to the next point in the second list with the next highest density score. By going to the next point in the second list, in response to the signal/flag, the clustering algorithm may reduce the number of computations that the clustering algorithm has to perform to create the clusters, thereby optimizing on the time and cost of generating clusters. For example, after creating the first cluster and in response to receiving the flag, the cluster creation engine 158 does not have to interact with the density score computation engine 156 to re-compute the density scores of other points in the affected cluster windows and re-organize the points in the second list. Instead, the cluster creation engine 158 just proceeds to the next point in the second list and creates a second cluster with the next point as the cluster center, so long as the next point is not included in the first cluster. If the next point is in the first cluster, the cluster creation engine 158 ignores the next point and proceeds to a point following the next point in the next list. In some implementations, once the first cluster has been created, the points that were included in the first cluster are removed from consideration in the second list. As a result, the next point in the second list would be a point with the next highest density score.

The cluster creation engine 158 of the network space mapper 150 thus proceeds to next point in the second list (i.e., point $p1_5$) in the cluster window w1 that has the next highest density score to define a second cluster. During creation of cluster (for the first cluster and each subsequent cluster), the cluster creation engine 158 determines if the density score of the next point (i.e., a potential cluster center for the next cluster) is above the minimum threshold value. For example, in the example illustrated in FIG. 4, the cluster center for cluster C1 was point $p1_4$ and the density score of point $p1_4$ was 6, which is greater than the predefined minimum threshold value of 5. As a result, the cluster creation engine 158 created the cluster C1 with point $p1_4$ as the cluster center. After re-computing the density score of the remaining points in cluster window w1, the cluster creation engine 158 determines if the density score of the next point in the cluster window w1 is above the predefined minimum threshold value.

The next point within the cluster window w1 identified in the re-organized second list is shown to be point $p1_5$ with a density score of 2. The cluster creation engine 158 verifies to see if the density score of the next point $p1_5$ is above the predefined minimum threshold value (i.e., the predefined minimum threshold value is 5 and the density score of the next point $p1_5$ is 2). The density score of point $p1_5$ is below the predefined minimum threshold value. Based on the verification, the cluster creation engine 158 will ignore the next point $p1_5$ and not create the second cluster for point $p1_5$ in the first cluster window. Further, since the second list of points is re-organized in accordance to the density scores, when the density score of point $P1_5$ in the first cluster window w1 does not meet the minimum threshold value, it can be safely assumed that the remaining points in the first cluster window (w1) will have either the same density score or lower density score than point $p1_5$. As a result, the cluster creation engine 158 will not create any more clusters for any of the remaining points in the cluster window w1. Consequently, point $p1_2$ with density score zero and point $p1_5$ with density score of 2 will be unaccounted for under any clusters created within cluster window w1. These points may be accounted under a cluster formed for points from other cluster windows. If, however, they are not accounted for under any of the clusters, these points $p1_2$ and $p1_5$ will become unaccounted points or "straggler points" within cluster window w1.

The cluster creation engine 158 proceeds to the next cluster window along the first latitude and repeats the process of picking the first point in the second list related to the second cluster window w2 and with the highest density score, for creating a second cluster C2. In the example illustrated in FIG. 4, the remaining points in the second cluster window w2 were re-organized in the second list based on the re-computed density scores, after creation of cluster C1. As a result, the re-organization of the remaining points of cluster window w2 in the second list are in the following order—points $p2_3$, $p2_8$ each with density score 6, followed by points $p2_1$ and $p2_7$ each with density score 4, which are then followed by point $p2_2$ with density score of 2. In some implementation, when more than one point in the same cluster window has the same density score, then the points may be organized in the second list in accordance to the latitude of the respective points. The cluster creation engine 158 identifies the next point in the second cluster window as point $p2_3$ and a second cluster C2 is created to include all the other points that were considered when computing the density score for point $p2_3$. The second cluster C2 is created upon verifying that the density score of cluster center $p2_3$ is above the predefined minimum threshold value. Thus, the second cluster C2 is created with point $p2_3$ as the cluster center and includes the following points—$p2_1$, $p2_2$, $p2_7$ and $p2_8$ from cluster window w2 and $p3_2$ and $p3_3$ from cluster window w3. Once again, based on the inclusion of certain points in the second cluster C2, the density scores of the remaining points in both cluster windows w2 and w3 from which points were used to create cluster C2, are re-computed and the second list related to points in the cluster windows w2 and w3 are re-organized, while retaining the second list of points related to other cluster windows intact as none of those points' density scores were affected.

As mentioned earlier, the re-computation of the density score of the remaining points in the cluster windows is necessitated due to inclusion of some points in the cluster C1 or C2, and for not being available for consideration for the remaining points in the network space. This process of creating cluster, re-computing density scores and re-organizing the second list continues till all the points within the network space are accounted under one or the other cluster. After a first cluster is created for a point within a cluster window, when the density score of remaining points in the cluster window are re-computed, there may be instances where the re-computed density scores of the remaining points within the cluster window is below the predefined minimum threshold value. In such cases, the remaining points are ignored—i.e., no cluster is created for the remaining points in the cluster window. Then the next cluster window defined for a next point along the same latitude as the point associated with the first cluster, is selected and the process continues with identifying the cluster center and generating a cluster for the cluster center upon determining the density score of the cluster center is above the predefined minimum threshold value. For example, the next point that is along the same latitude as point $p1_1$ associated with cluster window w1 is point $p2_1$ and the cluster window defined for $p2_1$ is w2. So, the network space mapper algorithm 150 proceeds to w2 to repeat the process of identifying the cluster center and creating the next cluster. The clusters are created by making sure that each of the points is accounted under only one cluster at any time. A sample table identifying the points within different cluster windows used for creating clusters is shown below in table 1:

TABLE 1

| | Second list: | | | | |
|---|---|---|---|---|---|
| Window # | density score (1st pass) | cluster C1 | density score (2nd pass) | C2 | Density score (3rd pass) |
| w1 | p14 = 6 | cluster center | | | |
| | p13 = 5 | C1 | | | |
| | p11 = 4 | C1 | | | |
| | p12 = 2 | | p15 = 2 | | ignored (low density score) |
| | p15 = 2 | | p12 = 0 | | ignored (low density score) |
| w2 | p21 = 7 | | p23 = 6 | cluster center | |
| | p23 = 6 | | p27 = 6 | C2 | |
| | p24 = 6 | C1 | p21 = 4 | C2 | |
| | p25 = 6 | C1 | p28 = 3 | C2 | |
| | p27 = 6 | | p22 = 2 | C2 | |
| | p22 = 4 | | | | |
| | p26 = 4 | C1 | | | |
| | p28 = 3 | | | | |
| w3 | p32 = 5 | | same | C2 | |
| | p33 = 5 | | same | C2 | |
| | p34 = 4 | | same | | p31 = 3 |
| | p31 = 3 | | same | | p34 = 1 |
| w4 | p41 = 5 | | p41 = 5 | | same |
| | p44 = 5 | | p42 = 4 | | same |
| | p42 = 4 | | p44 = 4 | | same |
| | p45 = 4 | | p45 = 3 | | same |
| | p43 = 3 | C1 | p46 = 3 | | same |
| | p46 = 3 | | p47 = 3 | | same |
| | p47 = 3 | | | | |

There may be instances when the density score of all the remaining points within a particular cluster window does not meet the minimum threshold value. In such instances, the cluster creation engine 158 will ignore the points in the particular cluster window and continue onward to the following cluster window and begin to evaluate the points in the following cluster window to determine if a new cluster can be created with any one or more of the points as the cluster center. In this instance, the remaining points in the particular cluster window are "straggler points" that will be processed after all the clusters have been created for the network space.

FIG. 4A illustrates a sample geo cluster developed for a portion of a geographical area of IP space, in one implementation. The geo clusters were generated using 100 mile clustering radius. Each section enclosed by a solid line represents a geo cluster with each dot representing a measured IP address—a single client device or a sub-net address.

The geo clustering illustrated in FIG. 4A is generated by sorting all geo location entries by latitude. As the distance per change of longitude varies by the distance from the equator (i.e., converging near the poles), the distance per change of latitude is a constant 111 km per degree. Then the network space mapper (i.e., density based clustering algorithm) is employed to generate the clusters in two passes. Both passes move a sliding window along a given latitude with boundary cutoffs calculated for all points within a maximum clustering distance between each point for which the cluster window is being generated and the point that defines the boundary using the latitude and ignoring the longitude of the points. An initial sort is done in accordance to the latitudinal coordinates of all the points in the network space to generate a first list and cluster windows are defined for each point in the first list using the boundary cutoffs defined by a predefined maximum clustering distance. Using the points in the first list, the algorithm performs two passes. In the first pass, density score of each point within each cluster window is calculated by summing the number of points in the cluster window that are within the maximum cluster distance. The density score of each point in each cluster window is used to generate a second list that is organized by grouping all the points in each cluster window grouped together, starting with a point with the highest density score. In the second pass, the point with the highest density score in a cluster window is set as a cluster center and including all points that are within the clustering radius, wherein the clustering radius is defined to be the maximum clustering distance. In order to determine which points to include in the cluster, a Haversine distance is calculated between the point that is the cluster center and each of the other points. The resulting clusters generated from these two passes are shown in FIG. 4A as clusters C1-C17.

Information related to the clusters that are generated including cluster identifier, cluster center identifier, information related to the points within the cluster are stored in a clusters datastore 166 and used by the cluster creation engine 158 and by the density score computation engine 156 when creating other clusters for the network space.

Referring back to FIG. 2, during the generation of the different clusters for the network space, there may be some points within one or more cluster windows that fall outside the Haversine distance of the cluster center (e.g., points $p1_2$ and $p1_5$ from the above example illustrated in FIG. 4). Alternately, there may be points within a particular cluster window whose density scores are below the minimum threshold value. These points are "straggler points" as they are not accounted under any one of the clusters. A straggler point processing engine 160 may be used by the network space mapper 150 to identify the straggler points and associate these points to select one or more clusters, after the clusters have been created for the points in the network space with the exception of the straggler points. A straggler point identifiers 160a within the straggler point processing engine 160 is used to identify the straggler points within the one or more cluster windows within the network space. The straggler point identifiers 160a may identify points $p1_2$ and $p1_5$ from cluster window w1 as straggler points. Additionally, all the points in cluster windows w7, w8 and w9 of FIG. 4 may also be considered as straggler points as the density score of each of these points fall below the predefined minimum threshold value.

Once the straggler points are identified, a straggler point association engine 160b may be used to associate each one of the straggler points to a cluster that is created for the different points in the network space. The straggler point association engine 160b may use simple distance computation to identify the distance between a straggler point and cluster centers of clusters that are proximate to the straggler point to identify a cluster center of a particular cluster that is proximate to the straggler point. Based on the proximity determination, the straggler point is then associated with the identified cluster. As straggler points are very few and far between, the amount of proximity determination to associate the straggler points to respective clusters are minimal. The straggler point association engine 160b proceeds to account each and every straggler point to a particular cluster created within the network space.

Once the clusters are created for the network space, information related to the cluster may be stored in clusters datastore 166. In some implementation, information provided in the Table 1 above may be included in the clusters datastore 166 and updated as each cluster is being generated. Thus, the information included in the clusters datastore 166 may include the cluster identifier, cluster center identifier, details of points from each cluster window in the second list that are included in each cluster, etc.

The clusters thus created accurately model the areas of the world that should have similar network performance. Based on the information provided in the clusters, network characteristics can be efficiently managed to provide better service. This type of clustering lowers operational cost as every cluster is created and maintained based on density distribution while ensuring that each cluster that is created has points with similar network characteristics. The clusters thus created allow the system to easily identify local clusters with client devices having similar network paths and the network characteristics of the different client devices within each cluster. The system can then use the cluster information to compare round trip time (RTT) of client devices in different networks and/or ISPs. Since the expectation is that the client devices in the same geo region and similar network paths will have similar performance, any differences in the performance attributes of the different client devices within the same cluster can indicate a problem with the network space connectivity. The clusters can be used to identify client devices within a cluster with sub-optimal network performance. The clusters can also be used to identify and compare performance metrics of clusters that are located geographically apart from one another but have similar network characteristics. Results from the comparison can be used to determine which one of the clusters have optimal performance and which ones have sub-optimal performance (i.e., with round trip time latencies above a predefined threshold) in a fast and efficient manner and use the information to proactively act to improve the network performance.

Once all the clusters are generated, the information updated to the clusters datastore 166 may be used to generate one or more reports. The reports may provide details of the geographical area where each cluster is located, points that are included in the cluster, the cluster center, and the network characteristics shared by the respective points including round trip time of data packets that are being exchanged between the client devices and the content server(s). The reports can be used to precisely identify where demands for content are highest, the time period of such demands, network load due to the demand, any round trip time latencies that are occurring, etc. Information from the reports may be used to proactively provision sufficient network resources or take other corrective actions to improve the network performance for the client devices in the clusters that need improvement.

Figure 5:
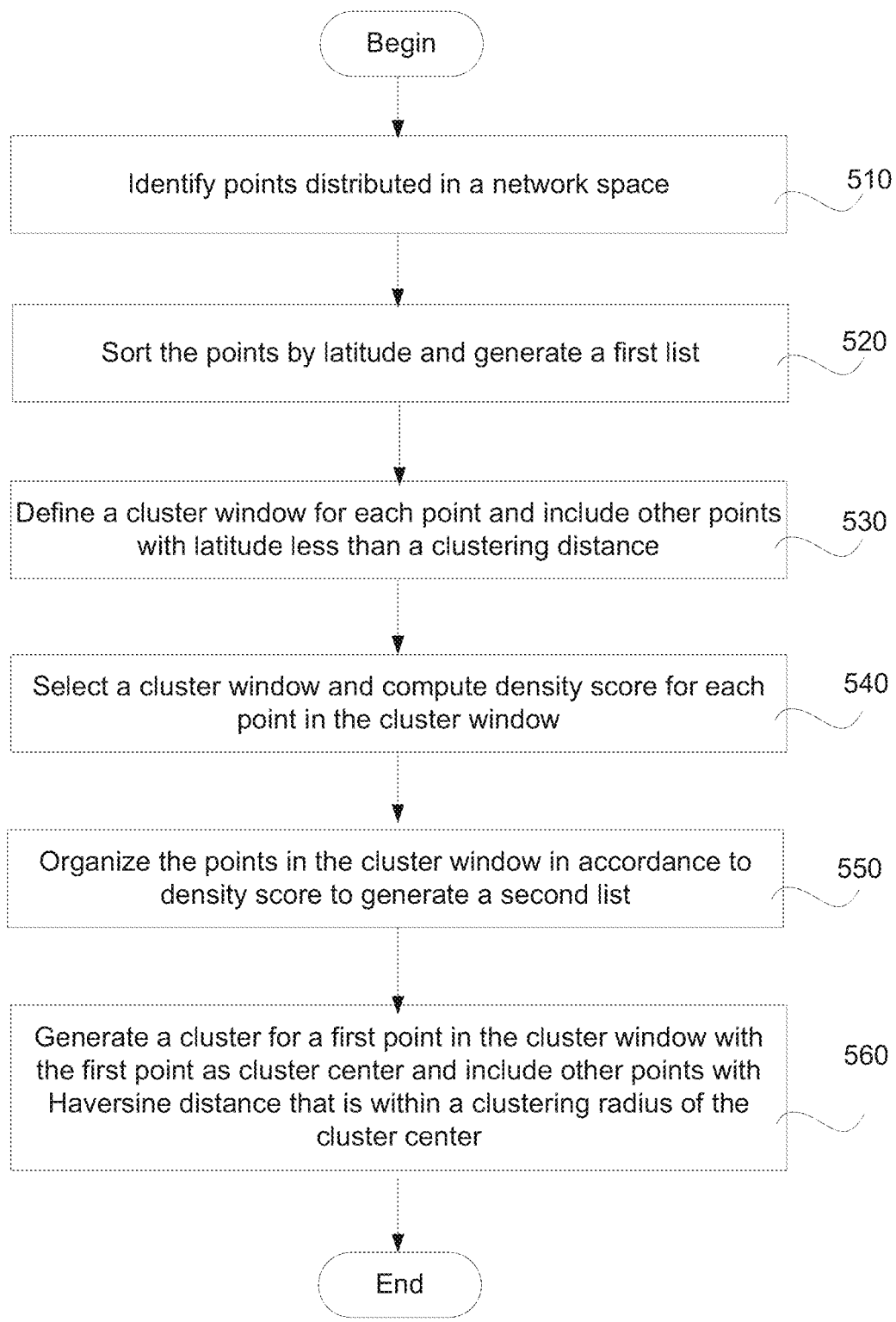
FIG. 5 illustrates a flow chart identifying method operations followed for determining optimal solution for an article of content identified for a user, in accordance with an embodiment of the invention.

With the general understand of the various embodiments, a method for mapping client devices within a network space will be described with reference to FIG. 5. The method begins at operation 510, wherein a plurality of points that are distributed in the network space are identified. Each point corresponds to one or more client devices. For example, a point may correspond to a sub-net address with more than one client device being associated with the sub-net address. The client devices are part of a content distribution network system with each client device being used to request content from a content distribution network server. Each point in the network space is represented using latitudinal and longitudinal coordinates.

The plurality of points in the network space is sorted by latitude to generate a first list of points, as illustrated in operation 520. The latitude is chosen over longitude as the distance between two consecutive latitude is uniform. Starting with the first point in the first list, a cluster window is defined using a predefined clustering distance, as illustrated in operation 530. The clustering distance may be based on density of distribution of the points in the network space. Thus, when the density of distribution is high, the clustering distance may be small and vice versa. In some implementation, the clustering distance may be defined to be about 50 miles or about 100 miles. The clustering distance is used to define a boundary for the cluster window, wherein the boundary identifies a beginning point and an end point. The cluster window so defined includes a plurality of points with latitudes that fall within the clustering distance range. Additional cluster windows are defined by sliding the cluster window from the first point to successive points along the same latitude as the first point.

Once the cluster windows are defined for the different points, a cluster window defined for the first point is selected and a density score is computed for each of the points within the cluster window of the first point, as illustrated in operation 540. The density score for a first point is defined by counting a number of other points in the cluster window that fall within a clustering radius of the first point. The clustering radius is defined by the clustering distance that was used to create the cluster window.

Upon computing the density scores of all the points in the cluster window of the first point, the points are organized into a second list in accordance to the density score, starting with the point with the highest density score at the top of the second list, as illustrated in operation 550. The second list that is created includes all the points from each of the cluster windows defined for the different points in the network space, arranged in order of the density score starting with the point with the highest density score. Once the second list has been created, the network space mapper 150 starts with a point of the cluster window that is at the top of the second list and creates a cluster with the point having the highest density score designated as the cluster center, as illustrated in operation 560. The created cluster includes points that are within a Haversine distance from the cluster center. The points that are included in the cluster may include points from only the cluster window or may include points from neighboring cluster windows depending on the distance of the points from the cluster center. Once the cluster is created for the first point in the second list, the points that were included in the cluster are removed from consideration for the remaining points in the network space. As a result, the density score of one or more of the remaining points within the cluster window and one or more of the neighboring cluster windows may have to be re-computed as the points that were originally considered when computing the density score of the different points may now no longer be available for consideration. The re-computing of the density score of one or more of the points may result in re-organizing the second list as the density scores of the different points may have been affected by the inclusion of some of the points in the cluster defined for the first point. The re-organized second list is used to create additional clusters for the network space. The process of creating cluster, re-computing density scores and re-organizing the second list continues till all the points in the network space are accounted under one or the other clusters.

This way of geo-clustering allows for efficient clustering of the entire network (IP address) space and for generating density-based clusters. The network space mapper 150 (i.e., clustering algorithm) may be run periodically as and when IP addresses of the client devices are available. In some implementations, the clustering algorithm defined herein may be run on a daily basis. The density-based clusters allows the system to improve the network of millions of client devices by accurately modeling the areas of the world and grouping the client devices that should exhibit similar network performance, thereby leading to efficient networks that provide better service. This type of geo-clustering has resulted in lower operational cost and increased user experience/satisfaction.

The advantages of the various embodiments are numerous. For example, by using latitude during initial sorting of points, the clustering algorithm avoids using expensive Haversine distance computation when creating cluster windows. Once the windows have been created and the density scores have been determined, the Haversine distance calculations are used to create the clusters. Using the Haversine distance computation for points within local optimal cluster windows and avoiding the Haversine distance computation when identifying cluster windows, leads to lower operational cost when mapping the client devices. This is due to reduction in the search space as the clustering algorithm (network space mapper 150) uses a sliding window approach along latitude to minimize the number of points under consideration and by relaxing the constraints of clustering by finding local optimal clusters instead of trying to find the global optimal clusters. Other advantages of the clustering algorithm defined herein may be realized by one skilled in the art.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network. A sample computer system identifying the backend server infrastructure used to execute the network space mapper (i.e., clustering algorithm) of FIG. 2, is depicted in FIG. 6.

An embodiment of an exemplary client device 110 suitable for use with the present invention includes a display having display screen. The client device includes standard computer components such as a disk drive, CDROM drive, display adapter, network card, random access memory (RAM), central processing unit (CPU), and other components, subsystems and devices. The client device also includes user input devices such as a mouse having buttons and keyboard. Other user input devices such as a trackball, touch-screen, digitizing tablet, etc., can also be used. In general, the computer system is illustrative of but one type of computer system, such as a desktop computer, suitable for use with the present invention. Computers can be configured with many different hardware components and can be of different styles (e.g. laptop, palmtop, handheld computing devices, workstation, mobile computing devices, wearable computing devices, etc). Any hardware platform suitable for performing the processing described herein is suitable for use with the present invention.

Figure 6:
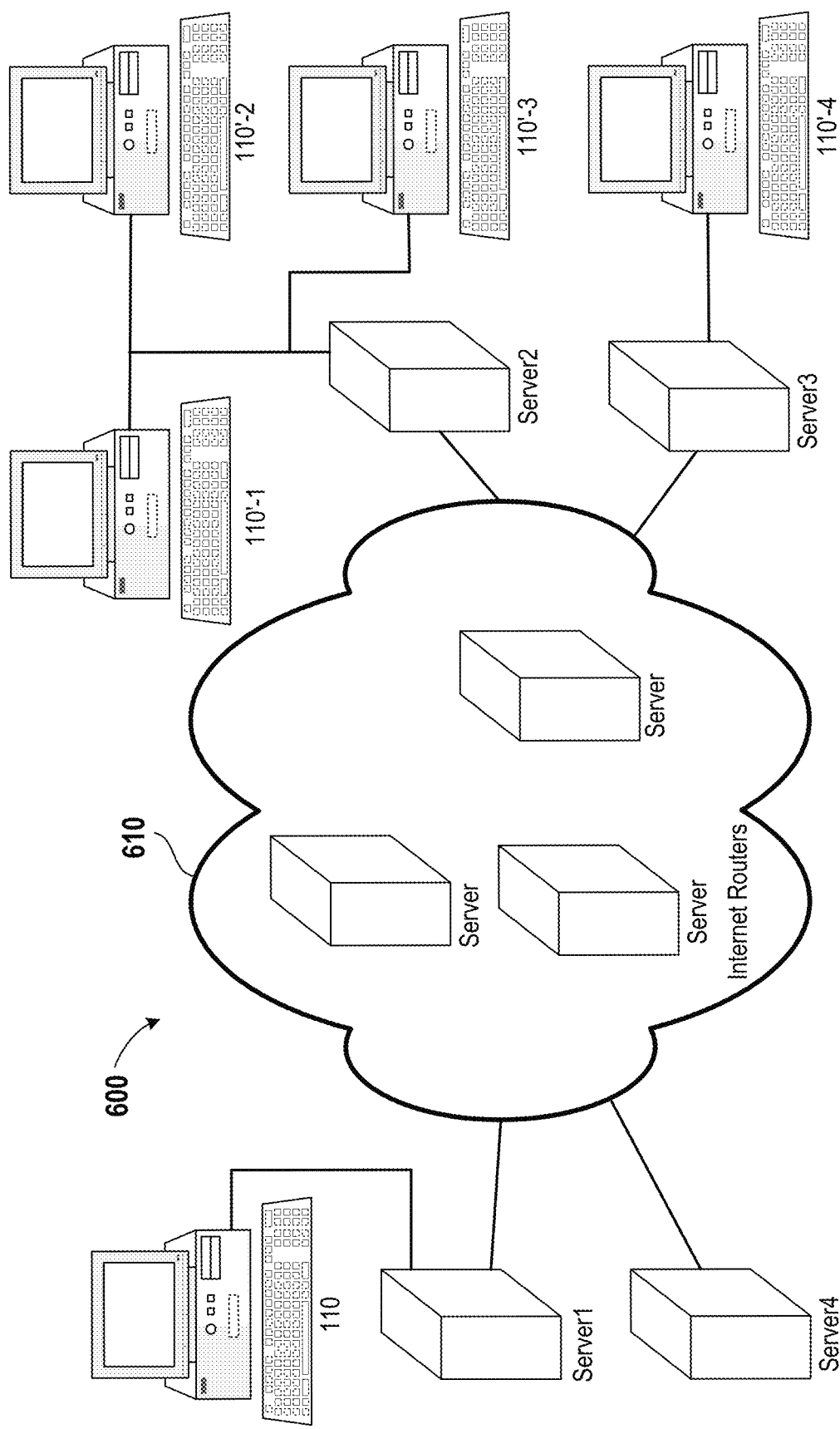
FIG. 6 is a generalized diagram of a typical network suitable for use with the present invention.

FIG. 6 is a generalized diagram of a typical network. In FIG. 6, the network system 600 includes several local networks coupled to the Internet. Although specific network protocols, physical layers, topologies, and other network properties are presented herein, embodiments of the present invention are suitable for use with any network.

In FIG. 6, a client device 110 is connected to Server1. This connection can be by a network such as Ethernet, Asynchronous Transfer Mode, IEEE standard 1553 bus, modem connection, Universal Serial Bus, etc. The communication link need not be wired but can be wireless communication link, such as infrared, radio wave transmission, etc. Server1 is coupled to a network 120, such as the Internet. The Internet is shown symbolically as a collection of server routers 610. Note that the use of the Internet is for requesting/receiving content from a content distribution network or for accessing content on a remote server. In some implementation, client device 110 can be connected directly to the Internet. Server1's connection to the Internet is typically via a relatively high bandwidth transmission medium.

In some implementations, one or more of client devices 110' may be geographically distributed in close proximity or away from client device 110 and connected to the network 120 utilizing a local network. For instance, the client devices 110'-1 through 110'-3 may be coupled to the Internet via Server2 and client device 110'-4 via Server3.

Note that the concepts of "client device" and "server," as used in this application and the industry are very loosely defined and, in fact, are not fixed with respect to machines or software processes executing on the machines. Typically, a server is a computing device that is providing information to another machine or process, i.e., the "client device," that requests the information. Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, client devices, such as desktop computers, laptop computers, mobile computing devices, thin client computing devices, etc., are primarily used to obtain information from the Internet in response to a request from a user operating the client device. Depending on the specific software executing at any point in time on these computing devices (both client device and server computing device), the client device may actually be performing the role of a client or server, as the need may be. For example, a first client device can provide information to a second client device, or a first server may directly communicate with a second server computer via a "peer-to-peer," communication. Although processes of the present invention, and the hardware executing the processes, may be characterized by language common to a discussion of the Internet (e.g., "client," "server," "peer") it should be apparent that software (i.e., network space mapper or clustering algorithm 150) of the present invention can execute on any type of suitable hardware including networks other than the Internet.

Although software of the present invention may be presented as a single entity, such software is readily able to be executed on multiple machines. That is, there may be multiple instances of the clustering algorithm that may be executing on different server computing devices, etc., and the client devices distributed across the world can be mapped using the programming logic included in the clustering algorithm. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or personal information manager (also referred to as a "PIM") smart cellular or other phone or mobile computing device or wearable computing device, so-called smart card, set-top box, or any of the like. The clustering algorithm (i.e., network space mapper 150) is a computer program that is configured to execute on a computing device. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" or "computer-readable media" for purposes of embodiments of the present invention may be any medium/media that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, carrier wave, or computer memory. The computer readable medium may have suitable instructions for synchronously presenting multiple video program ID streams, such as on a display screen, or for providing for input or presenting in accordance with various embodiments of the present invention.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for mapping client devices within a network space, comprising:
    identifying a plurality of points distributed in the network space, wherein each point of the plurality of points corresponds to one or more client devices that are used to request content from a content distribution server and is represented in the network space using a latitude and a longitude;
    sorting the plurality of points by latitude to generate a first list of points;
    defining a cluster window for each point in the first list using a predefined clustering distance, the predefined clustering distance identifying a beginning point and an end point, wherein the cluster window includes select ones of other points from the network space with a latitude that is less than the predefined clustering distance from the point;
    computing a density score for each point in each cluster window by counting a number of other points that are within a clustering radius of a respective point, wherein the clustering radius is defined by the predefined clustering distance;
    organizing points of the network space into a second list with points of each cluster window grouped together in accordance with the computed density score within each cluster window, starting with a specific point within each cluster window with a highest density score; and
    generating a cluster with the specific point of a cluster window as a cluster center, the cluster including select ones of points from the second list whose Haversine distance from a specific point are within the clustering radius,
    wherein each of clusters generated for the network space models an area within the network space where a plurality of client devices exhibit similar network characteristics, the clusters generated for the network space are used to identify performance issues including round trip time latency that exceeds by a predefined amount.

2. The method of claim 1, wherein generating the cluster includes removal of the select ones of points included in the cluster from further consideration in the network space.

3. The method of claim 1, wherein generating the cluster includes re-calculating the density score for remaining points within one or more cluster windows in the second list by removing from consideration the select ones of points that are included in the cluster, wherein the re-calculating causes re-organization of the remaining points in the corresponding one or more cluster windows within the second list, based on the re-calculated density score.

4. The method of claim 3, wherein generating the cluster includes selecting a next point in the cluster window from the second list and generating a second cluster with the next point as a cluster center for the second cluster, the second cluster generated upon confirming that the re-calculated density score of the next point is above a predefined minimum threshold value.

5. The method of claim 1, wherein the cluster is generated when the density score for the cluster center is above a pre-defined minimum threshold value.

6. The method of claim 1, wherein generating the cluster for each point in the first list includes:
    sliding the cluster window along the latitude from the point to a second point in the first list and identifying a second cluster window for the second point, the second cluster window including one or more of other points with latitude that are within the predefined clustering distance;
    identifying the second point or one of the other points in the second cluster window as the cluster center for a second cluster, based on the density score computed for the second point and each one of the other points in the second cluster window; and
    generating the second cluster by including select ones of the points in the second list that are within the clustering radius defined by the predefined clustering distance from the cluster center of the second cluster, the select ones of the points included in the second list are not part of any other cluster defined for the network space, wherein inclusion of the select ones of the points in the second cluster causes removal of the select ones of the points from further consideration in the network space.

7. The method of claim 6, wherein the second cluster is generated after verifying that the density score of the cluster center of the second cluster is above the predefined minimum threshold value.

8. The method of claim 1, wherein computing the density score further includes incrementing the latitude to identify a next latitude, and identifying a cluster window for a next point along the next latitude and computing the density score of all points in the cluster window identified for the next point along the next latitude,
    wherein the next latitude is identified based on distribution of the plurality of points in the network space.

9. The method of claim 1, wherein generating the cluster further includes:

identifying one or more straggler points within one or more cluster windows defined for the network space, the one or more straggler points located outside of the predefined clustering radius from the cluster center of the corresponding clusters; and associating each one of the one or more straggler points to specific ones of clusters generated for the plurality of points in the network space based on proximity of the respective ones of the straggler points from the corresponding specific ones of the clusters.

10. The method of claim 1, wherein the cluster window represents a geographical area that is a square.

11. The method of claim 1, wherein one or more points in the network space correspond to a sub-net address, and wherein each sub-net address identifies one or more client devices.

12. The method of claim 11, wherein the density score computed for a point that corresponds to a sub-net address takes into consideration the one or more client devices that are part of the sub-net.

13. The method of claim 1, wherein the mapping of the client devices is done periodically.

14. The method of claim 1, further includes generating a report, the report identifying one or more clusters with performance issues including round trip time latency that exceeds by the predefined amount, wherein the report provides data to identify the one or more clusters and location of points within the one or more clusters generated for the network space with sub-par round trip time latency.

15. A content distribution network system including a server executing a network space mapping algorithm for mapping client devices within the network space, the network space mapping algorithm configured to:
   identify a plurality of points distributed in the network space, wherein each point of the plurality of points corresponds to one or more client devices that are used to request content from the server and is represented in the network space using a latitude and a longitude;
   sort the plurality of points by latitude to generate a first list of points;
   define a cluster window for each point in the first list using a predefined clustering distance, the predefined clustering distance identifying a beginning point and an end point, wherein the cluster window includes select ones of other points from the network space with a latitude that is less than the predefined clustering distance from the point;
   for each cluster window, compute a density score for each point included in the cluster window by counting a number of other points that are within a clustering radius of a respective point, wherein the clustering radius is defined by the predefined clustering distance;
   organize points of the network space into a second list in accordance with the cluster window and in accordance with the density score within each cluster window, starting with a specific point within each cluster window with a highest density score; and
   generate a cluster with the specific point in the cluster window as a cluster center, the cluster including select ones of points from the second list whose Haversine distance from a specific point are within the clustering radius,
   wherein each of clusters generated for the network space models an area within the network space where a plurality of client devices exhibit similar network characteristics, the clusters generated for the network space are used to identify performance issues including round trip time latency that exceeds by a predefined amount.

16. The content distribution network system of claim 15, wherein the network space mapping algorithm is further configured to remove the select ones of the points included in the cluster from further consideration in the network space.

17. The content distribution network system of claim 15, wherein the network space mapping algorithm is further configured to:
   re-calculate the density score for remaining points within one or more cluster windows in the second list due to the select ones of the points included in the cluster being removed from consideration; and
   re-organize the remaining points in the corresponding one or more cluster windows within the second list based on the re-calculated density score.

18. The content distribution network system of claim 15, wherein the network space mapping algorithm is further configured to:
   verify the density score of the specific point defining the cluster center of the cluster is above a predefined minimum threshold value prior to generating the cluster.

19. The content distribution network system of claim 15, wherein the network space mapping algorithm is further configured to:
   identify one or more straggler points within one or more cluster windows defined for the network space, the one or more straggler points located outside of the predefined clustering radius from the cluster center of the corresponding clusters; and
   associate each one of the one or more straggler points to a specific cluster generated for the plurality of points in the network space, the associating based on proximity of the respective ones of the straggler points from the corresponding clusters.

* * * * *